United States Patent
Watanabe et al.

(10) Patent No.: US 9,633,361 B2
(45) Date of Patent: Apr. 25, 2017

(54) COMMERCIAL TRANSACTION MANAGEMENT DEVICE, COMMERCIAL TRANSACTION MANAGEMENT METHOD, COMMERCIAL TRANSACTION MANAGEMENT PROGRAM, AND COMPUTER-READABLE RECORDING MEDIUM FOR RECORDING SAME PROGRAM

(75) Inventors: Yasuharu Watanabe, Tokyo (JP); Shigeru Itahashi, Tokyo (JP)

(73) Assignee: Rakuten, Inc., Tokyo (JP)

( * ) Notice: Subject to any disclaimer, the term of this patent is extended or adjusted under 35 U.S.C. 154(b) by 252 days.

(21) Appl. No.: 14/346,876

(22) PCT Filed: Mar. 30, 2012

(86) PCT No.: PCT/JP2012/058626
§ 371 (c)(1),
(2), (4) Date: Jun. 4, 2014

(87) PCT Pub. No.: WO2013/046761
PCT Pub. Date: Apr. 4, 2013

(65) Prior Publication Data
US 2014/0304052 A1     Oct. 9, 2014

(30) Foreign Application Priority Data
Sep. 30, 2011    (JP) ............................... P2011-217819

(51) Int. Cl.
    *G06Q 30/00*        (2012.01)
    *G06Q 30/02*        (2012.01)
    (Continued)

(52) U.S. Cl.
CPC ....... *G06Q 30/0222* (2013.01); *G06Q 20/387* (2013.01); *G07G 1/0036* (2013.01); *G07G 1/14* (2013.01)

(58) Field of Classification Search
CPC combination set(s) only.
See application file for complete search history.

(56) References Cited

U.S. PATENT DOCUMENTS

2002/0077907 A1*   6/2002   Ukai ................. G06Q 30/0211
                                                             705/14.13
2002/0143612 A1*   10/2002   Barik ..................... G06Q 30/02
                                                             705/14.23

(Continued)

FOREIGN PATENT DOCUMENTS

JP         2002-083149 A      3/2002
JP         2002-334256 A      11/2002

(Continued)

OTHER PUBLICATIONS

International Search Report issued in International Application No. PCT/JP2012/058626 dated May 1, 2012.

(Continued)

*Primary Examiner* — Matthew T Sittner
(74) *Attorney, Agent, or Firm* — Sughrue Mion, PLLC

(57) ABSTRACT

A commercial transaction management device includes a coupon creation control unit that receives a coupon issuance request containing sales terms when purchasing a plurality of items together from one user, a determination unit that determines whether to accept the sales terms based on information from a shop related to the items, and an issuance unit that issues an electronic coupon when it is determined to accept the sales terms. This enables an offer of a coupon that matches a desire of one user. In addition, the commercial transaction management device further includes a purchase receiving unit that receives a purchase order of a plurality of items with the sales terms from another user having received an offer of the coupon from one user, and (Continued)

therefore other users can also purchase a plurality of items with the sales terms contained in the coupon.

5 Claims, 25 Drawing Sheets

(51) Int. Cl.
  *G07G 1/14* (2006.01)
  *G07G 1/00* (2006.01)
  *G06Q 20/38* (2012.01)

(56) References Cited

U.S. PATENT DOCUMENTS

| | | | | |
|---|---|---|---|---|
| 2002/0156676 | A1* | 10/2002 | Ahrens | G06Q 30/06 705/14.17 |
| 2004/0054575 | A1* | 3/2004 | Marshall | G06Q 30/0236 705/14.36 |
| 2004/0128241 | A1* | 7/2004 | Akama | G06Q 20/10 705/39 |
| 2004/0220884 | A1* | 11/2004 | Khan | G06Q 30/08 705/80 |
| 2005/0027595 | A1* | 2/2005 | Ha | G06Q 30/02 705/14.14 |
| 2005/0033643 | A1* | 2/2005 | Smith | G06Q 20/20 705/14.35 |
| 2010/0010887 | A1* | 1/2010 | Karlin | G06Q 30/02 705/14.15 |
| 2010/0262475 | A1* | 10/2010 | Gavriline | G06Q 30/0211 705/14.13 |
| 2011/0010470 | A1* | 1/2011 | Hulbert | G06F 3/0219 710/13 |
| 2011/0264504 | A1* | 10/2011 | Patel | G06Q 30/02 705/14.35 |
| 2011/0276430 | A1* | 11/2011 | Vyas | G06Q 30/02 705/26.8 |
| 2012/0253906 | A1* | 10/2012 | Lapica | G06Q 30/00 705/14.23 |
| 2013/0013389 | A1* | 1/2013 | Vitti | G06Q 30/0207 705/14.35 |

FOREIGN PATENT DOCUMENTS

| | | |
|---|---|---|
| JP | 2004-094406 A | 3/2004 |
| JP | 2005-122273 A | 5/2005 |
| JP | 2006-252160 A | 9/2006 |
| JP | 2008146512 A | 6/2008 |
| JP | 2008152589 A | 7/2008 |

OTHER PUBLICATIONS

Japanese Office Action dated May 7, 2014 issued in Japanese Patent Application No. P2011-217819.

* cited by examiner

Fig.6

| SHOP ID | ITEM ID | ITEM NAME | PRICE | DESCRIPTION | URL | QUANTITY OF STOCK |
|---|---|---|---|---|---|---|
| M1 | T101 | PEN | ¥1000 | ... | $U_{101}$ | $N_{101}$ |
| M1 | T102 | PEN CASE | ¥800 | ... | $U_{102}$ | $N_{102}$ |
| M1 | T103 | INK | ¥600 | ... | $U_{103}$ | $N_{103}$ |
| ... | ... | ... | ... | ... | ... | ... |
| M2 | T201 | SHOES | ¥12000 | ... | $U_{201}$ | $N_{201}$ |
| M2 | T202 | SHIRTS | ¥5800 | ... | $U_{202}$ | $N_{202}$ |
| ... | ... | ... | ... | ... | ... | ... |

Fig.10

| COUPON ID | SHOP ID | ITEM ID | USER ID | COUPON NAME | REGULAR PRICE | DESIRED PRICE | FLAG | URL |
|---|---|---|---|---|---|---|---|---|
| C1 | M1 | T101, T102, T103 | U1 | U1 SET | ¥2400 | ¥1700 | 1 | addr1 |
| C2 | M2 | T201, T202 | U2 | U2 SPORT | ¥17800 | ¥12000 | 0 | — |
| ... | ... | ... | ... | ... | ... | ... | ... | ... |

Fig.11

| USER ID | LEVEL | POINTS EARNED |
|---------|----------|---------------|
| USER 1  | PLATINUM | 1200          |
| USER 2  | GOLD     | 800           |
| USER 3  | PLATINUM | 1000          |
| ⋮       | ⋮        | ⋮             |

Fig.12

| USER ID | COUPON ID | SHOP ID | TOTAL AMOUNT OF SALES | PURCHASE USER ID | COUPON PUBLICATION INFORMATION |
|---------|-----------|---------|-----------------------|------------------|-------------------------------|
| USER 1  | C11       | M1      | 200000円              | USER 11          | URL11                         |
|         |           |         |                       | USER 12          | URL12                         |
|         |           |         |                       | USER 13          | URL11                         |
|         |           |         |                       | ...              | ...                           |
|         | C21       | M2      | 65000円               | USER 12          | URL21                         |
|         |           |         |                       | USER 11          | URL21                         |
|         |           |         |                       | ...              | ...                           |
|         | ...       | ...     | ...                   | ...              | ...                           |
| USER 2  | C12       | M1      | 42000円               | USER 21          | URL31                         |
|         |           |         |                       | USER 22          | URL32                         |
|         |           |         |                       | USER 23          | URL32                         |
|         |           |         |                       | ...              | ...                           |
|         | ...       | ...     | ...                   | ...              | ...                           |
| ...     |           |         |                       |                  |                               |

Fig.13

| NOTIFICATION CONDITIONS |
|---|
| DISCOUNT:60% OR LESS |
| QUANTITY:10 OR LESS |
| ⋮ |

Fig.21

| SHOP ID | APPROVAL CONDITIONS |
|---|---|
| M1 | DISCOUNT RATE: 30% OR LESS |
| M2 | DISCOUNT AMOUNT: ¥2000 OR LESS |
| ⋮ | ⋮ |

*Fig.25*

| USER ID | REWARD(AFFILIATE) |
|---------|-------------------|
| USER 1  | ¥3200             |
| USER 2  | ¥800              |
| USER 3  | ¥350              |
| ⋮       | ⋮                 |

COMMERCIAL TRANSACTION MANAGEMENT DEVICE, COMMERCIAL TRANSACTION MANAGEMENT METHOD, COMMERCIAL TRANSACTION MANAGEMENT PROGRAM, AND COMPUTER-READABLE RECORDING MEDIUM FOR RECORDING SAME PROGRAM

CROSS REFERENCE TO RELATED APPLICATIONS

This is a National Stage of International Application No. PCT/JP2012/058626 filed Mar. 30, 2012, claiming priority based on Japanese Patent Application No. 2011-217819 filed Sep. 30, 2011, the contents of all of which are incorporated herein by reference in their entirety.

TECHNICAL FIELD

The present invention relates to a commercial transaction management device, a commercial transaction management method, a commercial transaction management program, and a computer-readable recording medium for recording the program.

BACKGROUND ART

In an existing electronic commerce site, an offer of a benefit to a user has been made by giving a discount on the price of an item by issuing a coupon, for example. In Patent Literature 1 below, a system that issues benefit information based on user information is disclosed. Further, in Patent Literature 2 below, a system that determines a coupon to be distributed to a user based on attributes of the user and a coupon use history of the user is disclosed.

CITATION LIST

Patent Literature

PTL 1: Japanese Unexamined Patent Application Publication No. 2002-083149
PTL 2: Japanese Unexamined Patent Application Publication No. 2004-094406

SUMMARY OF INVENTION

Technical Problem

In an existing electronic commerce site or the like, a shop has issued a coupon for a discount on a certain item in anticipation of sales of the item in a one-sided manner. However, when a benefit such as a coupon is given to a user, the content of the benefit has been determined by an offerer of the item and the benefit, and therefore there has been a case where a benefit that meets the user's requirements has not been offered. Specifically, a user has desired to receive an offer of a coupon with desired content, and a shop has desired to increase sales by offering a coupon.

In view of the foregoing, an object of the present invention is to provide a commercial transaction management device, a commercial transaction management method, a commercial transaction management program, and a computer-readable recording medium for recording the program that can offer a coupon that meets a user's requirements and thereby increase sales of items and the like related to the coupon in electronic commerce.

Solution to Problem

To solve the above problem, a commercial transaction management device according to one aspect of the present invention is a commercial transaction management device that receives registration of item information indicating items on sale from a shop and receives an order for purchase of items indicated by the registered item information from a user, including a request receiving means configured to receive a coupon issuance request containing item information related to a plurality of items selected by one user from the items registered by the shop and sales terms when purchasing the plurality of items together from said one user, a determination means configured to determine whether to accept the sales terms contained in the coupon issuance request received by the request receiving means based on information acquired from the shop, a coupon issuance means configured to, when the sales terms are accepted by the determination means, issue an electronic coupon allowing purchase of the plurality of items indicated by the item information contained in the coupon issuance request with the sales terms to said one user, and a purchase receiving means configured to receive a purchase order of the plurality of items with the sales terms contained in the electronic coupon from another user different from said one user and having received an offer of the electronic coupon issued by the coupon issuance means from said one user.

A commercial transaction management method according to one aspect of the present invention is a commercial transaction management method in a commercial transaction management device that receives registration of item information indicating items on sale from a shop and receives an order for purchase of items indicated by the registered item information from a user, the method including a request receiving step of receiving a coupon issuance request containing item information related to a plurality of items selected by one user from the items registered by the shop and sales terms when purchasing the plurality of items together from said one user, a determination step of determining whether to accept the sales terms contained in the coupon issuance request received in request receiving step based on information acquired from the shop, a coupon issuance step of, when the sales terms are accepted in the determination step, issuing an electronic coupon allowing purchase of the plurality of items indicated by the item information contained in the coupon issuance request with the sales terms to said one user, and a purchase receiving step of receiving a purchase order of the plurality of items with the sales terms contained in the electronic coupon from another user different from said one user and having received an offer of the electronic coupon issued in the coupon issuance step from said one user.

A commercial transaction management program according to one aspect of the present invention is a commercial transaction management program causing a computer to function as a commercial transaction management device that receives registration of item information indicating items on sale from a shop and receives an order for purchase of items indicated by the registered item information from a user, the program causing the computer to implement a request receiving function to receive a coupon issuance request containing item information related to a plurality of items selected by one user from the items registered by the shop and sales terms when purchasing the plurality of items together from said one user, a determination function to determine whether to accept the sales terms contained in the coupon issuance request received by the request receiving function based on information acquired from the shop, a coupon issuance function to, when the sales terms are accepted by the determination function, issue an electronic coupon allowing purchase of the plurality of items indicated by the item information contained in the coupon issuance request with the sales terms to said one user, and a purchase receiving function to receive a purchase order of the plurality of items with the sales terms contained in the electronic coupon from another user different from said one user and having received an offer of the electronic coupon issued by the coupon issuance function from said one user.

A computer-readable recording medium according to one aspect of the present invention stores a commercial transaction management program causing a computer to function as a commercial transaction management device that receives registration of item information indicating items on sale from a shop and receives an order for purchase of items indicated by the registered item information from a user, the commercial transaction management program causing the computer to implement a request receiving function to receive a coupon issuance request containing item information related to a plurality of items selected by one user from the items registered by the shop and sales terms when purchasing the plurality of items together from said one user, a determination function to determine whether to accept the sales terms contained in the coupon issuance request received by the request receiving function based on information acquired from the shop, a coupon issuance function to, when the sales terms are accepted by the determination function, issue an electronic coupon allowing purchase of the plurality of items indicated by the item information contained in the coupon issuance request with the sales terms to said one user, and a purchase receiving function to receive a purchase order of the plurality of items with the sales terms contained in the electronic coupon from another user different from said one user and having received an offer of the electronic coupon issued by the coupon issuance function from said one user.

According to the above-described aspects, sales terms in the case of purchasing a plurality of items all together are received as the content of a coupon which one user desires to issue, and it is determined whether the sales terms are acceptable. Then, when it is determined to accept the sales terms, the coupon is issued. It is thereby possible to offer the coupon that matches the desire of the user. Further, because a purchase order of a plurality of items with the sales terms from other users who have received an offer of the coupon from one user can be received, other users can also purchase the plurality of items with the sales terms contained in the coupon. The sales of the shop thereby increase.

A commercial transaction management device according to another aspect of the present invention may further include a notification means configured to notify the coupon issuance request received by the request receiving means to the shop having registered the items indicated by the item information contained in the coupon issuance request, and a receiving means configured to receive acceptance information indicating that the sales terms contained in the coupon issuance request are acceptable, the acceptance information transmitted from the shop in response to the coupon issuance request notified by the notification means, and the determination means may determine to accept the sales terms based on the acceptance information received by the receiving means.

According to the above aspect, because a coupon issuance request containing the sales terms of items desired by a user is notified to a shop, and acceptance of the sales terms is determined based on acceptance information indicating that the sales terms desired by the user are acceptable which is transmitted back from the shop in response to the notification of the coupon issuance request, it is possible to appropriately determine whether or not to accept the sales terms in the shop.

A commercial transaction management device according to another aspect of the present invention may further include a coupon creation control means configured to, when a shop to which the coupon issuance request is to be made is specified by a user, transmit an item information page containing an operating portion operable in a user terminal of the user to the user terminal in response to a request for the item information page showing items of the shop from the user and, when an operation is made on the operating portion in the item information page displayed on the user terminal, acquire the item information of the items shown on the item information page as the item information to be contained in the coupon issuance request.

According to the above aspect, when an item information page of a shop specified as a shop to which a coupon issuance request is to be made is requested from a user, an item information page including an operating portion as a user interface for coupon creation is provided to the user. Then, because a coupon issuance request containing the item information of the items is created simply by performing an operation on the operating portion, the user can easily create the coupon issuance request.

A commercial transaction management device according to another aspect of the present invention may further include a purchase item management means configured to, when purchase of a plurality of items contained in the coupon issuance request is received by the purchase receiving means, register the plurality of items in association with said another user in a purchase item list that stores items to be purchased for each user.

According to the above aspect, another user who has received an offer of an electronic coupon can register a plurality of items as items to be purchased in a purchase item list simply by making a purchase order of the plurality of items based on the electronic coupon, and therefore there is no need to perform an operation to make a purchase order for each item. Accordingly, a purchase order of a plurality of items contained in the electronic coupon can be made easily.

A commercial transaction management device according to another aspect of the present invention may further include a purchase processing means configured to perform purchase processing of the plurality of items based on a purchase order of the plurality of items from said another user based on the electronic coupon received by the purchase receiving means, and add a specified reward in accordance with purchase of the plurality of items by said another user to a reward of said one user in a reward information storage means configured to store a reward granted in accordance with a record of commercial transactions managed in the commercial transaction management device for each user.

According to the above aspect, when another user who has received an offer of an electronic coupon purchases items using the electronic coupon, a reward is granted to one user who has offered the electronic coupon, and therefore the level of satisfaction of one user increases. Further, granting a reward serves as motivation for one user to request the issuance of an electronic coupon.

A commercial transaction management device according to another aspect of the present invention may further include a purchase processing means configured to perform purchase processing of the plurality of items based on a purchase order of the plurality of items from said another user based on the electronic coupon received by the purchase receiving means, and store a purchase record of the plurality of items by said another user as a sales record of said one user into a sales record storage means configured to store purchase records of a plurality of items using an electronic coupon by users having received an offer of the electronic coupon as sales records of users to whom the electronic coupon has been issued.

According to the above aspect, a sales record based on an electronic coupon issued in response to a coupon issuance request by one user is accumulated in association with one user, and therefore information about the accumulated sales record can be used for determination whether or not to accept the sales terms contained in the coupon issuance request from one user.

In a commercial transaction management device according to another aspect of the present invention, the notification means may transmit a sales record of said one user stored in the sales record storage means together with the coupon issuance request to the shop.

According to the above aspect, a shop that has received a notification of the coupon issuance request can determine whether or not to accept the sales terms based on the sales record of one user.

In a commercial transaction management device according to another aspect of the present invention, the notification means may transmit attribute information of said one user acquired from a user information storage means configured to store attribute information of users for each user together with the coupon issuance request to the shop.

According to the above aspect, a shop that has received a notification of the coupon issuance request can determine whether or not to accept the sales terms based on attribute information of one user.

In a commercial transaction management device according to another aspect of the present invention, the notification means may refer to a notification condition storage means configured to store specified conditions related to the sales terms as notification conditions in advance, and when the sales terms contained in the coupon issuance request meet the notification conditions, transmit the coupon issuance request to the shop.

According to the above aspect, the coupon issuance request that contains the sales terms which do not meet notification conditions is not notified to a shop, and therefore it is possible to prevent an inappropriate coupon issuance request from being notified to a shop by setting appropriate notification conditions in advance.

A commercial transaction management device according to another aspect of the present invention may further include an approval condition receiving means configured to receive approval condition information related to acceptable sales terms from the shop and store the received approval condition information into an approval condition storage means configured to store the approval condition information, and the determination means may determine whether to accept the sales terms contained in the coupon issuance request by referring to the approval condition information received by the approval condition receiving means from the shop having registered the items indicated by the item information contained in the coupon issuance request received by the request receiving means.

According to the above aspect, whether or not to accept the sales terms contained in the coupon issuance request is determined based on the approval condition information received from a shop and stored in advance, and therefore the shop does not need to perform determination as to whether to accept the sales terms each time receiving one coupon issuance request from a user. It is thereby possible to reduce the load on the shop for processing of coupon issuance.

In a commercial transaction management device according to another aspect of the present invention, the approval condition information may include conditions related to at least one of prices of a plurality of items contained in the coupon issuance request, a discount amount and a discount rate from the price.

According to the above aspect, it is possible to determine whether or not to accept the sales terms desired by one user with various acceptance conditions described above.

Advantageous Effects of Invention

According to one aspect of the preset invention, it is possible to increase sales of items and the like related to a coupon by offering the coupon that meets a user's requirements in electronic commerce.

BRIEF DESCRIPTION OF DRAWINGS

FIG. 6 is a diagram showing a configuration of an item information storage unit and an example of data stored therein.

FIG. 10 is a diagram showing a configuration of a coupon storage unit and an example of data stored therein.

FIG. 11 is a diagram showing a configuration of a user information storage unit and an example of data stored therein.

FIG. 12 is a diagram showing a configuration of a sales record storage unit and an example of data stored therein.

FIG. 13 is a diagram showing a configuration of a notification condition storage unit and an example of data stored therein.

FIG. 21 is a diagram showing a configuration of an approval condition storage unit and an example of data stored therein.

FIG. 25 is a diagram showing a configuration of a reward storage unit and an example of data stored therein.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

Figure 1:
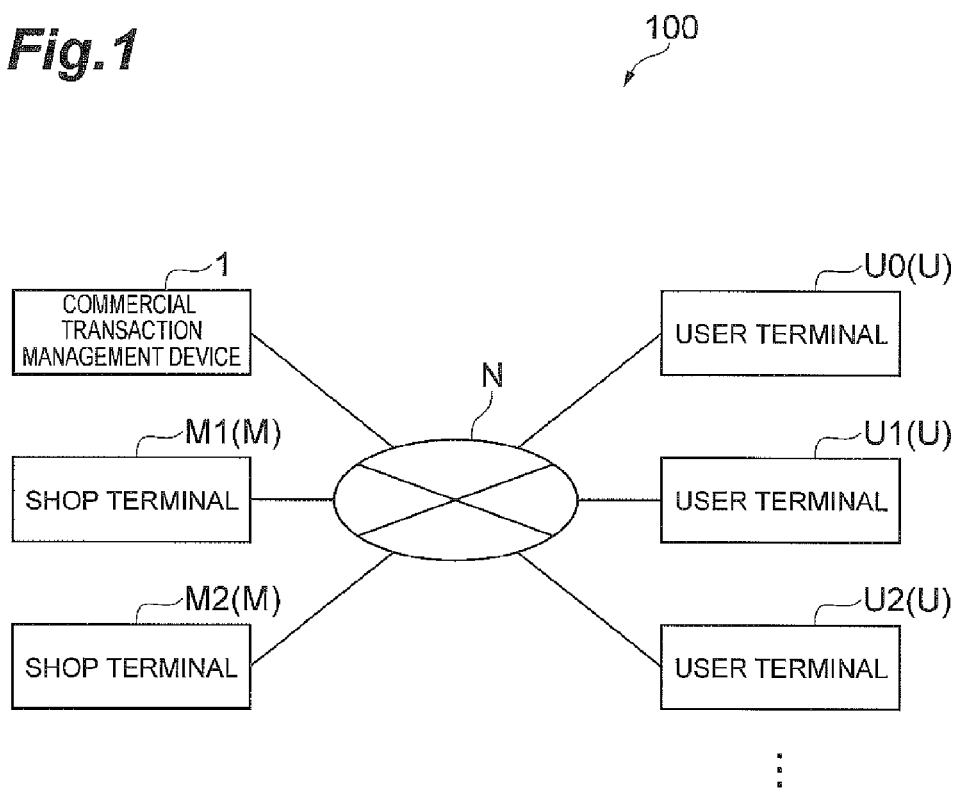
FIG. 1 is a diagram showing device components of a system including a commercial transaction management device.

FIG. 1 is a block diagram showing device components of a system 100 including a commercial transaction management device according to this embodiment. The system 100 includes a commercial transaction management device 1, a plurality of shop terminals M and a plurality of user terminals U. The commercial transaction management device 1 according to this embodiment is a device that receives registration of item information indicating items on sale (including sales terms) from a plurality of shops and further receives an order of purchase of items indicated by the registered item information from users. To be specific, the commercial transaction management device 1 provides an electronic commerce site, for example. The commercial transaction management device 1 receives the item information of items on sale from the shop terminal M and presents the item information to a user who accesses the electronic commerce site. Then, the commercial transaction management device 1 accepts item selection, purchase, payment processing and the like from the user terminal U and performs those processing.

The commercial transaction management device 1, the shop terminals M and the user terminals U can communicate with one another through a communication network N that is the Internet, a wireless LAN, a mobile communication network or the like. The commercial transaction management device 1 is a server, for example. Further, the shop terminals M and the user terminals U are mobile terminals, personal computers and the like, for example. Note that, although two shop terminals M and three user terminals U are shown in FIG. 1, the number of terminals in the system 100 is arbitrary.

First Embodiment

Figure 2:
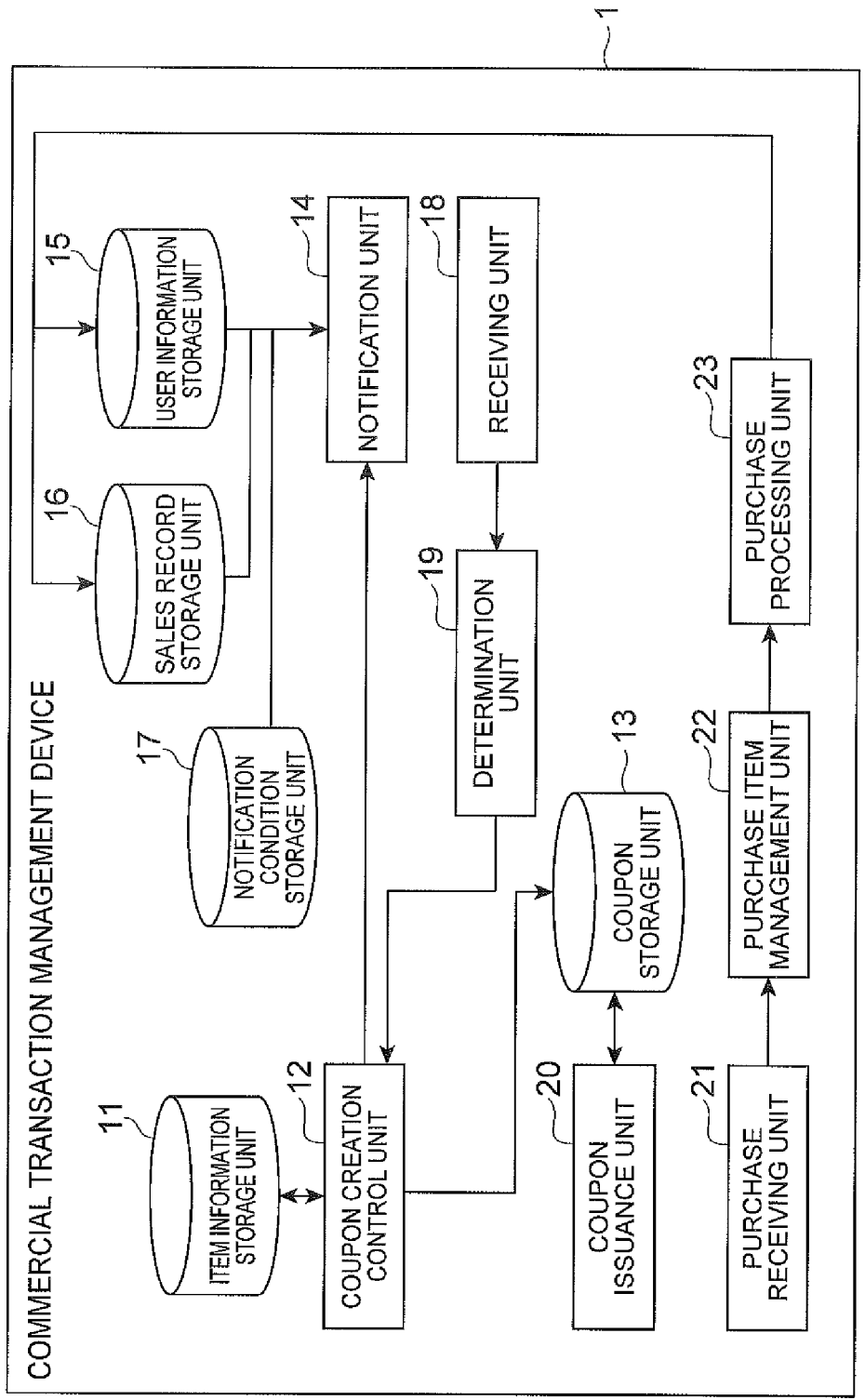
FIG. 2 is a block diagram showing a functional configuration of a commercial transaction management device according to a first embodiment.

FIG. 2 is a block diagram showing a functional configuration of the commercial transaction management device 1 according to the first embodiment. As shown in FIG. 2, the commercial transaction management device 1 functionally includes an item information storage unit 11, a coupon creation control unit 12 (request receiving means, coupon creation control means), a coupon storage unit 13, a notification unit 14 (notification means), a user information storage unit 15 (user information storage means, reward information storage means), a sales record storage unit 16 (sales record storage means), a notification condition storage unit 17 (notification condition storage means), a receiving unit 18 (receiving means), a determination unit 19 (determination means), a coupon issuance unit 20 (coupon issuance means), a purchase receiving unit 21 (purchase accepting means), a purchase item management unit 22 (purchase item management means), and a purchase processing unit 23 (purchase processing means). Although the functional units 11 to 23 are configured in one device in this embodiment, the functional units 11 to 23 may be included in different devices that can communicate with one another. For example, the storage units 11, 13, 14, 16 and 19 may be included in another device that can communicate with the commercial transaction management device 1.

Figure 3:
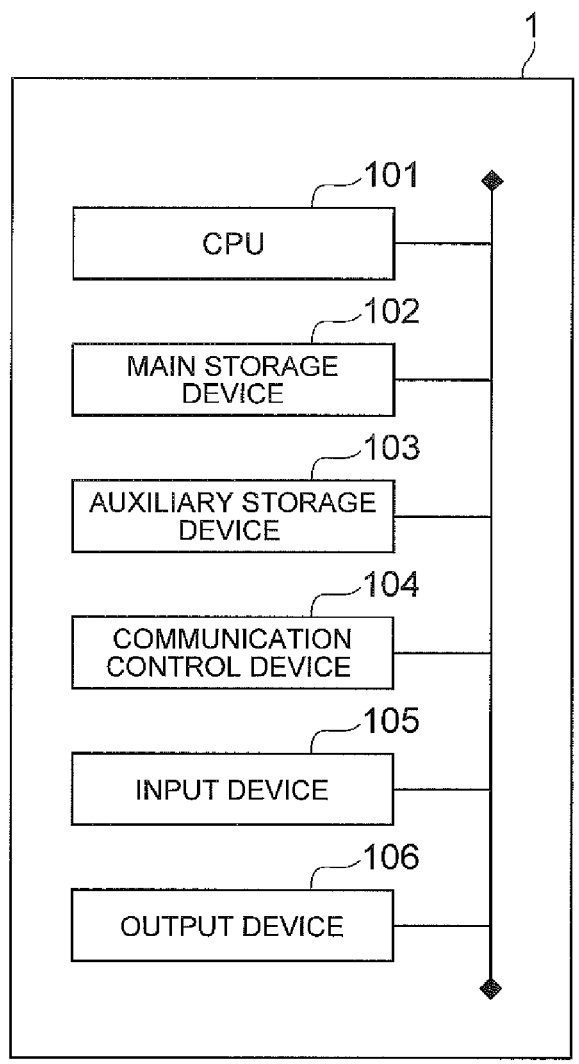
FIG. 3 is a diagram showing a hardware configuration of a commercial transaction management device.

FIG. 3 is a hardware configuration diagram of the commercial transaction management device 1. As shown in FIG. 3, the commercial transaction management device 1 is physically configured as a computer system that includes a CPU 101, a main storage device 102 such as memory like RAM and ROM, an auxiliary storage device 103 such as a hard disk, a communication control device 104 such as a network card, an input device 105 such as a keyboard and a mouse, an output device 106 such as a display and the like.

The functions shown in FIG. 2 are implemented by loading given computer software (commercial transaction management program) onto hardware such as the CPU 101 or the main storage device 102 shown in FIG. 3, making the communication control device 104, the input device 105 and the output device 106 operate under control of the CPU 101, and performing reading and writing of data in the main storage device 102 or the auxiliary storage device 103. Data and database required for the processing is stored in the main storage device 102 or the auxiliary storage device 103.

Figure 4:
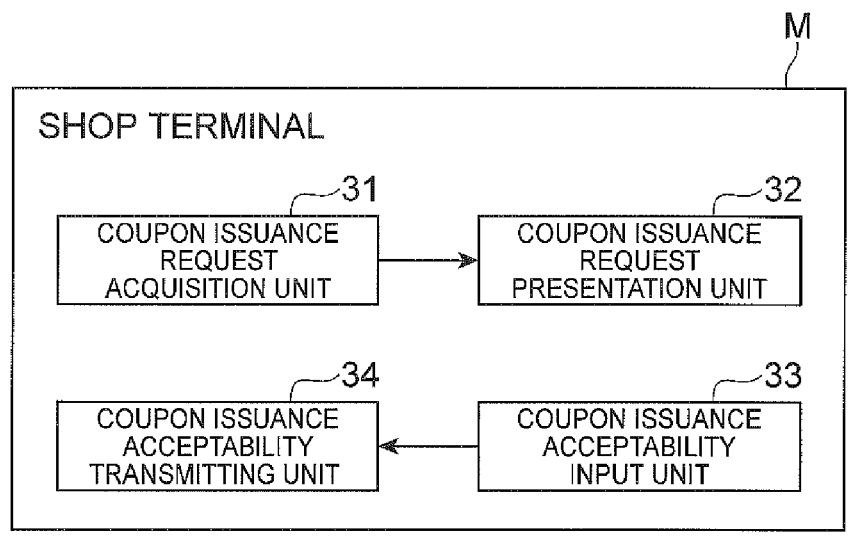
FIG. 4 is a block diagram showing a functional configuration of a shop terminal according to the first embodiment.

FIG. 4 is a block diagram showing a functional configuration of the shop terminal M according to the first embodiment. As shown in FIG. 4, the shop terminal M functionally includes a coupon issuance request acquisition unit 31, a coupon issuance request presentation unit 32, a coupon issuance acceptability input unit 33, and a coupon issuance acceptability transmitting unit 34. The shop terminal M, like the commercial transaction management device 1, is configured as a computer system and has a hardware configuration as shown in FIG. 3.

Figure 5:
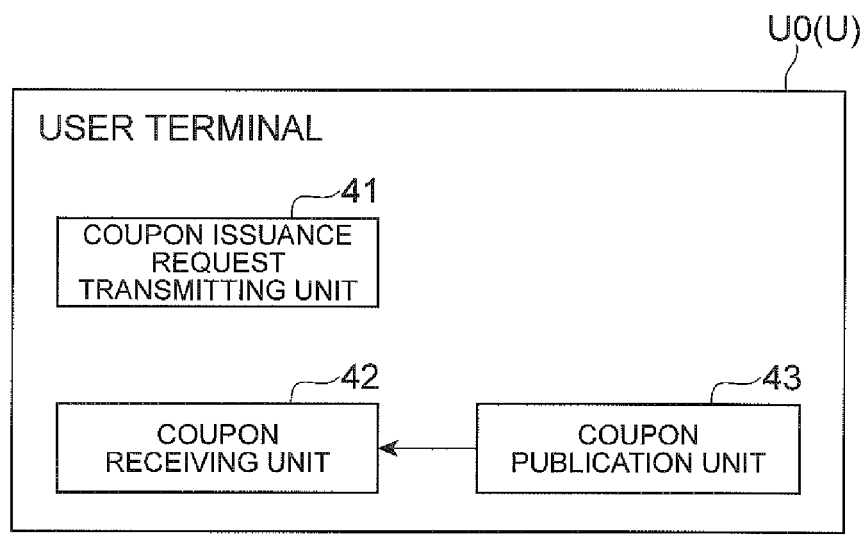
FIG. 5 is a block diagram showing a functional configuration of a user terminal according to the first embodiment.

FIG. 5 is a block diagram showing a functional configuration of the user terminal U. As shown in FIG. 5, the user terminal U functionally includes a coupon issuance request transmitting unit 41, a coupon receiving unit 42 and a coupon publication unit 43. The user terminal U, like the commercial transaction management device 1, is configured as a computer system and has a hardware configuration as shown in FIG. 3. The functional units of the commercial transaction management device 1 are described hereinafter with reference back to FIG. 2.

The item information storage unit 11 is a part that stores item information indicating items on sale in the commercial transaction management device 1. The item information is transmitted from the shop terminals M of shops and registered. FIG. 6 is a diagram showing a configuration of the item information storage unit 11 and an example of data stored therein. As shown in FIG. 6, the item information storage unit 11 stores a shop ID that identifies a shop, an item ID that identifies an item, an item name, an item price, and a description of an item. In addition, the item information storage unit 11 may further store URL on which the item information is published to sell the item, and the quantity of stock of the item.

In commercial transactions managed in the commercial transaction management device 1 according to this embodiment, an item information page generated based on data stored in the item information storage unit 11 is transmitted to the user terminal U in order to present item information to a user. Receiving the item information, the user selects items to be purchased through the user terminal U.

The coupon creation control unit 12 is a part that receives a coupon issuance request containing item information of a plurality of items selected by one user from the items registered by a shop and sales terms in the case of purchasing the plurality of items all together from one user. Further, the coupon creation control unit 12 transmits item information page containing an operating portion that is operable in the user terminal U of the user to the user terminal. Processing of receiving the coupon issuance request is specifically described hereinafter with reference to FIGS. 7 to 9.

Figure 7:
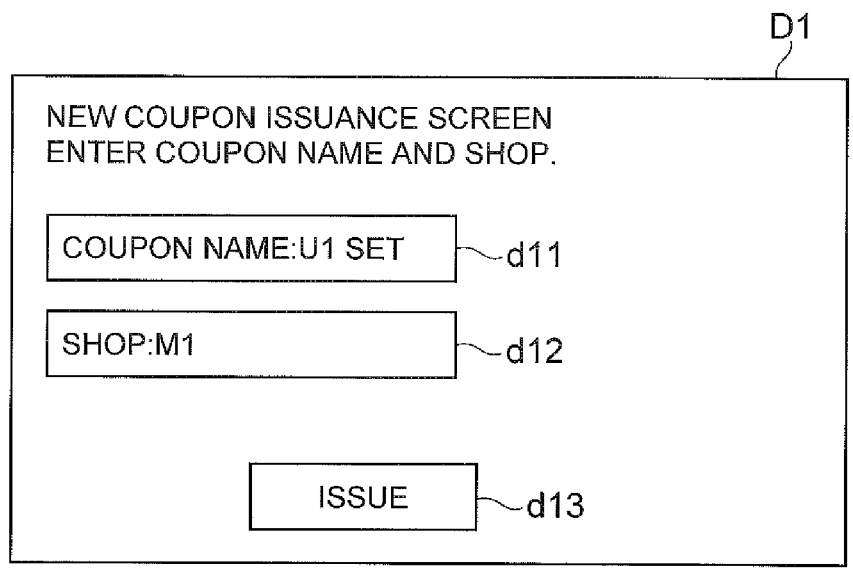
FIG. 7 is a diagram showing an example of a new coupon issuance screen displayed on a user terminal.

First, the coupon creation control unit 12 transmits a new coupon issuance screen for creating a coupon issuance request to the user terminal U in response to a request from the user terminal U. FIG. 7 is a diagram showing an example of a new coupon issuance screen D1 displayed on the user terminal U. As shown in FIG. 7, the new coupon issuance screen D1 includes a coupon name entry field d11, a shop name entry field d12 and an entry confirmation operating portion d13. When an operation is made on the entry confirmation operating portion d13 in the user terminal U, the coupon name entered in the coupon name entry field d11 and the shop name entered in the shop name entry field d12 are transmitted from the user terminal U to the coupon creation control unit 12. By this operation, the user terminal U is controlled to become the state able to select items to be contained in a coupon issuance request.

Figure 8:
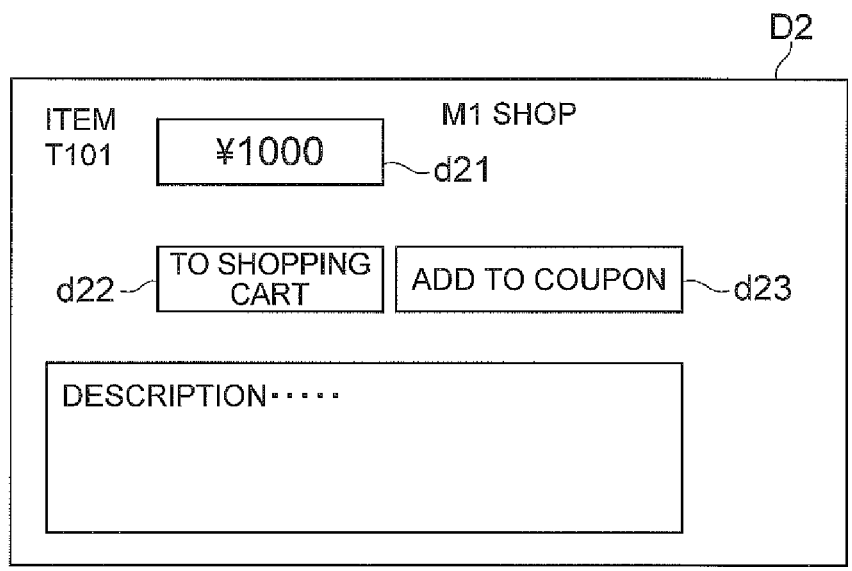
FIG. 8 is a diagram showing an example of a new coupon issuance screen displayed on a user terminal.

In this state, the user terminal U can select items to be contained in a coupon issuance request by referring to the item information page of the shop entered in the shop name entry field d12. FIG. 8 is a diagram showing an example of a new coupon issuance screen D2 transmitted from the coupon creation control unit 12 to the user terminal U. The coupon creation control unit 12 specifies the shop name entered on the new coupon issuance screen D1 shown in FIG. 7 in association with the user ID of the user terminal U, and when an item of the shop is specified by the user, generates an item information page D2 containing a user interface for coupon creation based on the item information stored in the item information storage unit 11 and transmits it to the user terminal U.

As shown in FIG. 8, the item information page D2 is a page indicating the item information of the item "T101" and contains an item price d21, an operating portion d22 and an operating portion d23. The operating portion d22 is an operating portion for adding the item to a so-called shopping cart. The operating portion d23 is an operating portion for including the item information of the item into a coupon issuance request. Specifically, when the coupon creation control unit 12 receives a request for transmitting the item information page of the item of the shop specified as a target of coupon creation from the user who has made a request for creating a coupon issuance request through the new coupon issuance screen D1 shown in FIG. 7, it generates the item information page D2 containing the operating portion d23 as a user interface for coupon creation. Then, when an operation is made on the operating portion d23 of the item information page D2 displayed on the user terminal U, the coupon creation control unit 12 acquires the item information of the item shown on the item information page D2 as item information to be contained in the coupon issuance request. The coupon creation control unit 12 of this embodiment provides an item information page that includes an operating portion as a user interface for coupon creation in addition to an item information page for general item purchase in order for registration of items in response to a coupon issuance request by a user. The user can thereby create a coupon issuance request easily. Note that, in the case of receiving a request for an item information page from a user different from the user who has made a request for creating a coupon issuance request, or a request for an item information page of items of a shop different from the shop specified as a target of coupon creation and issuance, the coupon creation control unit 12 transmits the item information page that does not include the operating portion d23 to the user terminal.

Figure 9:
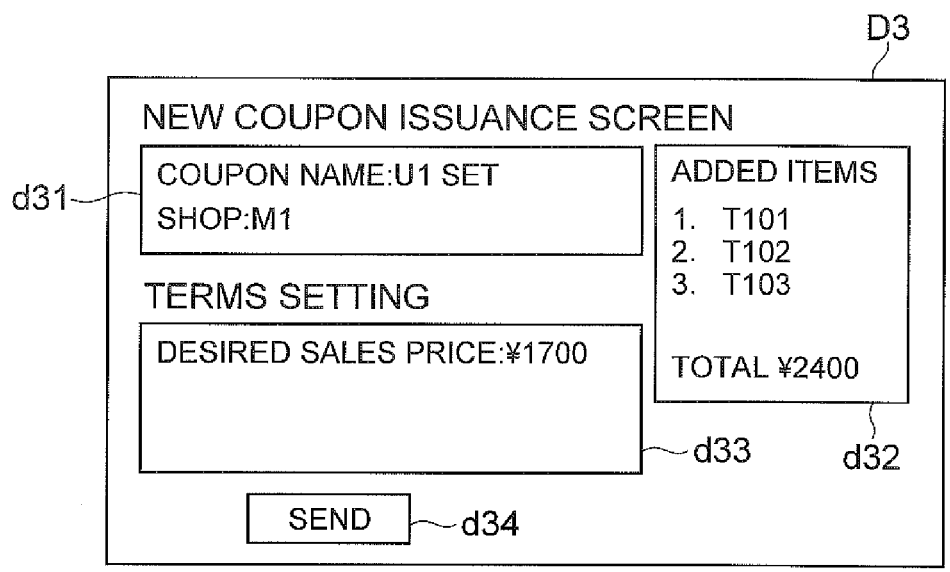
FIG. 9 is a diagram showing an example of a new coupon issuance screen displayed on a user terminal.

FIG. 9 is a diagram showing an example of a new coupon issuance screen D3 that is displayed on the user terminal U after a plurality of items are set as items to be contained in the coupon issuance request. On the new coupon issuance screen D3 shown in FIG. 9, the coupon name "U1 set" and the shop name "M1" entered on the new coupon issuance screen D1 are displayed in a display field d31. Further, on the new coupon issuance screen D3, the item IDs "T101", "T102" and "T103" of the items registered by the registration operation from the item information page D2 and the total price "¥2400" of the registered items are displayed in a display field d32.

A user can enter desired sales terms in a sales term entry field d33 of the new coupon issuance screen D3 displayed on the user terminal U. An example of the sales terms is a desired price in the case of purchasing a plurality of registered items all together. After the sales terms are entered, when an operation is made on a transmission operating portion d34 of the new coupon issuance screen D3, information of the entered sales terms is transmitted from the user terminal U to the coupon creation control unit 12. The coupon creation control unit 12 receives the information of the sales terms and then stores the received sales terms, together with the coupon name and the registered item information, as a coupon issuance request into the coupon storage unit 13. Note that a user who transmits a coupon issuance request is referred to as "coupon planning user" in the following description.

The coupon storage unit 13 is a part that stores the content of a coupon related to a coupon issuance request. FIG. 10 is a diagram showing a configuration of the coupon storage unit 13 and an example of data stored therein. As shown in FIG. 10, the coupon storage unit 13 stores, in association with a coupon ID that identifies a coupon, a shop ID of a shop that is specified as a target of coupon creation and issuance, item IDs of items contained in a coupon issuance request, a user ID of a coupon planning user, a coupon name, a regular price which is the sum total of the prices of the registered items, and a desired price as sales terms.

Further, the coupon storage unit 13 stores a flag and URL. The flag is information indicating whether acceptance of the sales terms is determined by the determination unit 19, and "1" is set when the sales terms are accepted. Further, the URL is information indicating the location of an issued electronic coupon. The URL is referred to hereinafter as "coupon URL". Specifically, the URL is notified from the commercial transaction management device 1 to the coupon planning user, and thereby issuance of a coupon for the coupon planning user is made. Further, the URL is transmitted from the coupon planning user to other users, and thereby an offer of a coupon to other users is made. Note that processing related to the flag and the URL is described later.

The content of the coupon issuance request that is received in the example of the processing described with reference to FIGS. 7 to 9 is stored as the coupon ID "C1" in the coupon storage unit 13 shown in FIG. 10.

The notification unit 14 is a part that notifies the coupon issuance request received by the coupon creation control unit 12 to the shop that has registered the items indicated by the item information contained in the coupon issuance request.

Further, the notification unit 14 may transmit attribute information of the coupon planning user, together with the coupon issuance request, to the shop. The attribute information of the user is acquired from the user information storage unit 15.

The user information storage unit 15 is a part that stores attribute information of users. FIG. 11 is a diagram showing a configuration of the user information storage unit 15 and an example of data stored therein. As shown in FIG. 11, the user information storage unit 15 stores, in association with a user ID that identifies a user, information such as a level and points earned as attributes. The level is an attribute that is assigned based on the amount and frequency of commercial transactions in the commercial transaction management device 1 or the like, and any one of three levels: "silver", "gold" and "platinum" is given with an increase in the amount of commercial transactions, for example. The points earned are the sum total of the points given in accordance with the amount of commercial transactions or the like.

As a result that the notification unit 14 transmits the attributes of a user together with the coupon issuance request to the shop, the shop that has received the coupon issuance request can determine whether or not to accept the sales terms in consideration of the user attribute information.

Further, the notification unit 14 may transmit a sales record of a user, together with the coupon issuance request, to the shop. The sales records of users are stored in the sales record storage unit 16.

The sales record storage unit 16 is a part that stores purchase records of a plurality of items using a coupon by users who have received an offer of the coupon as a sales record of a coupon planning user. FIG. 12 is a diagram showing a configuration of the sales record storage unit 16 and an example of data stored therein. As shown in FIG. 12, the sales record storage unit 16 stores, for each user ID as a coupon planning user, a coupon ID, a shop ID, total sales, a purchase user ID, and information about publication of a coupon. The coupon ID is the ID of a coupon issued to the coupon planning user. A shop ID is the ID of a shop that has accepted the sales terms of the coupon. The total sales is the sum total of the amount of purchase of items using a coupon by other users who have received an offer of the coupon from the coupon planning user. The purchase user ID is the ID of a user who has purchased the item using the coupon. The coupon publication information is information indicating the location of a web page and the like on which the coupon is published by the coupon planning user to offer the coupon to other users, and it is URL, for example. Specifically, the URL stored as the coupon publication information is the URL of a web page and the like on which the coupon is published, and it is different from the coupon URL.

The notification unit 14 can extract the sales record of the coupon planning user related to the coupon issuance request received by the coupon creation control unit 12 from the sales record storage unit 16 and transmit the sales record together with the coupon issuance request to the shop. The shop that has received the coupon issuance request can thereby determine whether or not to accept the sales terms in consideration of the sales record of the user related to the coupon issuance request. Note that, when transmitting information about the sales record to the shop, the notification unit 14 may refrain from transmitting information that identifies a user, such as a user ID.

Further, the notification unit 14 may transmit the quantity of stock of items contained in the coupon issuance request, together with the coupon issuance request, to the shop. Further, the notification unit 14 may calculate how many sets of items, which is a combination of a plurality of items related to the coupon issuance request, can be prepared based on the quantity of stock and then notify the calculated number of sets, together with the coupon issuance request, to the shop. The shop that has received the coupon issuance request can thereby determine whether or not to accept the sales terms in consideration of the quantity of stock or the number of sets that can be prepared.

Further, the notification unit 14 may notify the coupon issuance request to the shop only when the sales terms contained in the coupon issuance request meet the notification conditions stored in the notification condition storage unit 17. The notification condition storage unit 17 is a part that stores specified conditions related to the sales terms as notification conditions in advance. FIG. 13 is a diagram showing a configuration of the notification condition storage unit 17 and an example of data stored therein. As shown in FIG. 13, the notification condition storage unit 17 stores data such as "discount: 60% or less" as the notification conditions, for example. The notification unit 14 notifies the coupon issuance request to the shop only when the discount in the sales terms contained in the coupon issuance request is 60% or less, for example. This avoids notification of an inappropriate coupon issuance request with no consideration of a profit by sales of items, for example, to the shop. Note that the notification conditions may be set for each shop or each genre of items in the notification condition storage unit 17. In this case, notification conditions are set for each store or item genre in the notification condition storage unit 17 shown in FIG. 13.

Further, the notification unit 14 may notify the coupon issuance request to the shop only when the quantity of stock contained in the coupon issuance request is a certain number or more. The notification unit 14 can acquire the quantity of stock of items from the item information storage unit 11 through the coupon creation control unit 12.

The functional configuration of the shop terminal M is described hereinafter with reference to FIG. 4. The coupon issuance request acquisition unit 31 is a part that acquires the coupon issuance request transmitted from the commercial transaction management device 1. The coupon issuance request presentation unit 32 is a part that presents the coupon issuance request acquired by the coupon issuance request acquisition unit 31 to a user of a shop by displaying the request on a display for example. The shop user can thereby determine whether or not to accept the sales terms contained in the coupon issuance request by referring to the content of the presented coupon issuance request.

The coupon issuance acceptability input unit 33 is a part that receives an input of whether or not to accept the sales terms contained in the coupon issuance request presented by the coupon issuance request presentation unit 32 through a keyboard or mouse. In the case of accepting the sales terms, a shop can issue a coupon for selling a plurality of items contained in the coupon issuance request with the given sales terms. The coupon issuance acceptability transmitting unit 34 is a part that transmits acceptance information indicating that the sales terms contained in the coupon issuance request are acceptable to the commercial transaction management device 1.

The functional configuration of the commercial transaction management device 1 is described hereinafter with reference back to FIG. 2. The receiving unit 18 is a part that receives the acceptance information indicating that the sales terms contained in the coupon issuance request are acceptable which is transmitted back from the shop terminal M in response to the coupon issuance request notified by the notification unit 14. Specifically, the receiving unit 18 receives the acceptance information transmitted from the coupon issuance acceptability transmitting unit 34.

The determination unit 19 is a part that determines whether or not to accept the sales terms contained in the coupon issuance request. Specifically, the determination unit 19 determines to accept the sales terms based on the acceptance information received by the receiving unit 18. When the acceptance of the sales terms is determined by the determination unit 19, the coupon creation control unit 12 sets "1" to the flag of the coupon in the coupon storage unit 13. Further, the coupon creation control unit 12 issues a coupon URL representing the location of the page where the coupon is offered and sets it in the coupon storage unit 13. This enables the issuance of the coupon.

Note that the number of coupon URLs issued by the coupon creation control unit 12 may be more than one. By issuing a plurality of coupon URLs, users to whom the coupon is issued can offer the issued coupon to other users by publishing different coupon URLs for different media such as an email, a blog and a web page, for example. The commercial transaction management device 1 can thereby collect information about through which media the coupon has been offered to other users who have purchased the item using the coupon.

The coupon issuance unit 20 is a part that, when the sales terms are accepted by the determination unit 19, issues a coupon allowing purchase of a plurality of items indicated by the item information contained in the coupon issuance request with the given sales terms to the coupon planning user. Specifically, the coupon issuance unit 20 transmits information at least containing a coupon URL issued for the coupon to the coupon planning user. The coupon issuance unit 20 may transmit information such as the item information of the plurality of items that can be purchased by the issued coupon, the coupon name, the sum total of regular prices of the plurality of items and the sales terms to the coupon planning user. Further, the coupon issuance unit 20 may generate image data containing information such as the item information of the plurality of items, the coupon name, the sum total of regular prices of the plurality of items and the sales terms and provide the image data to the coupon planning user. The image data may be a banner, for example.

Figure 14:
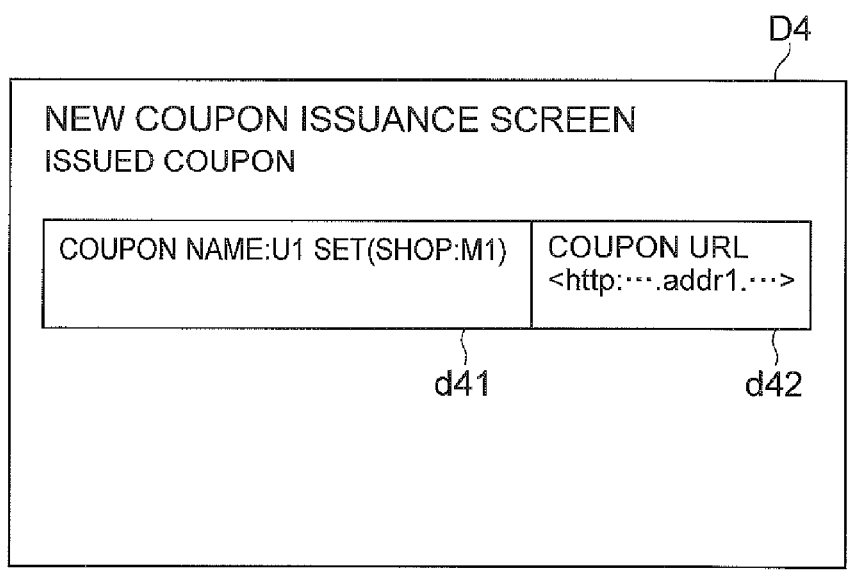
FIG. 14 is a diagram showing a coupon issued by a coupon issuance unit and shows an example of a new coupon issuance screen displayed on a user terminal of a coupon planning user.

FIG. 14 shows a coupon issued by the coupon issuance unit 20, and it shows an example of a new coupon issuance screen D4 that is displayed on a user terminal U0 of a coupon planning user. As shown in FIG. 14, the new coupon issuance screen D4 displays the name of the issued coupon in a display field d41 and displays the coupon URL in a display field d42.

The functional configuration of the user terminal U is described hereinafter with reference to FIG. 5. Particularly, the functional units that operate in the user terminal U0 of a coupon planning user are described below. As shown in FIG. 5, the user terminal U functionally includes a coupon issuance request transmitting unit 41, a coupon receiving unit 42, and a coupon publication unit 43.

The coupon issuance request transmitting unit 41 is a part that transmits a coupon issuance request to the commercial transaction management device 1. In this embodiment, the coupon issuance request transmitting unit 41 performs transmission of a coupon issuance request by inputting and transmitting information contained in the coupon issuance request in accordance with the coupon issuance screens D1 to D3 provided from the coupon creation control unit 12.

The coupon receiving unit 42 is a part that receives information of the coupon issued by the coupon issuance unit 20. Specifically, the coupon receiving unit 42 receives information at least containing the coupon URL issued in association with the issued coupon from the coupon issuance unit 20. The user terminal U0 displays the information of the coupon received by the coupon receiving unit 42 on the new coupon issuance screen D4 as shown in FIG. 14.

The coupon publication unit 43 is a part that offers the issued coupon to other users by publishing the coupon URL on media such as an email, a blog and a web page. Specifically, the media on which the coupon URL is published are transmitted to user terminals U of other users or displayed on user terminals U of other users, thereby achieving an offer of the coupon to other users. Note that a user to which the coupon is offered is referred to as "coupon use user" in the following description. Note that the information published on media may be an object containing a link to access the coupon URL instead of the coupon URL. In this case, a coupon planning user may be made to input information about media (for example, URL, email etc.) on which the coupon URL is published, and the input information may be transmitted from the user terminal U0 of the coupon planning user to the commercial transaction management device 1, so that the information stored in the coupon publication information of the sales record storage unit 16 shown in FIG. 12 is updated.

Figure 15:
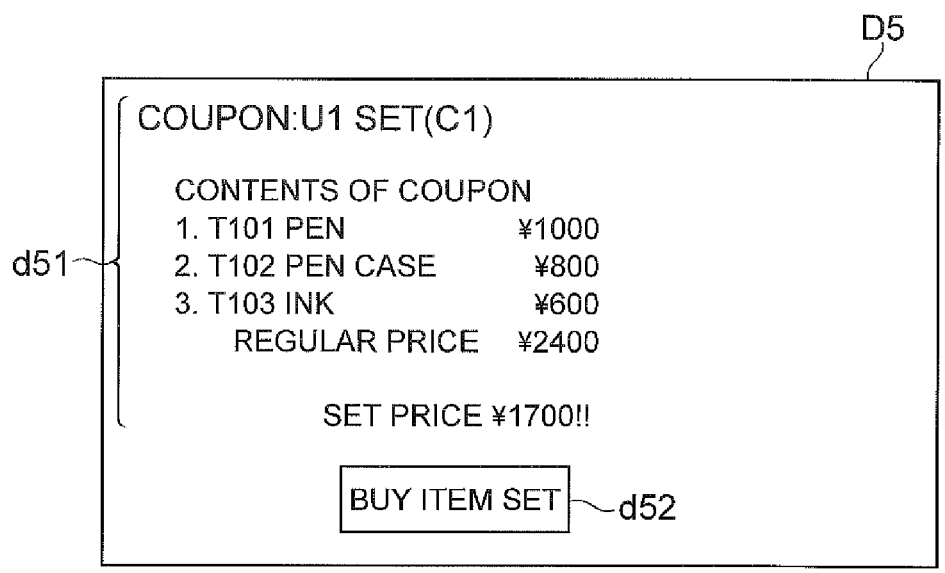
FIG. 15 is a diagram showing an example of a coupon screen.

When an operation to access the coupon URL published on the media is performed in the user terminal U of the coupon use user who has received an offer of the coupon, a coupon screen showing the content of the coupon is transmitted from the commercial transaction management device 1 to the user terminal U. FIG. 15 is a diagram showing an example of a coupon screen D5. As shown in FIG. 15, the coupon screen D5 displays the content of the coupon in a field d51 and includes an operating portion d52 for making a purchase order. When an operation is made on the operating portion d52 in the user terminal U on which the coupon screen D5 is displayed, purchase order information is transmitted from the user terminal U to the purchase receiving unit 21 of the commercial transaction management device 1.

Note that, when an operation to access the coupon URL is performed in the user terminal U of the coupon use user, information about media (for example, URL, email etc.) on which the coupon URL is published may be transmitted from the user terminal U of the coupon use user to the commercial transaction management device 1. This configuration may be implemented by a technique such as JAVA (registered trademark) script and the like, for example. In the commercial transaction management device 1, the information about media on which the coupon URL is published can be stored in the coupon publication information of the sales record storage unit 16 shown in FIG. 12 in association with the coupon ID of the coupon URL and the user ID of the coupon use user. This enables the commercial transaction management device 1 to measure the effects of media on which a coupon is published.

The functional configuration of the commercial transaction management device 1 is described hereinafter with reference back to FIG. 2. The purchase receiving unit 21 is a part that receives a purchase order of a plurality of items with the sales terms contained in a coupon from a coupon use user to whom the coupon has been offered by a coupon planning user. Specifically, the purchase receiving unit 21 receives purchase order information from the user terminal U.

The purchase item management unit 22 is a part that adds a plurality of item information contained in the coupon all together to a so-called shopping cart (purchase item list) for registering items to be purchased for each user when a purchase order is received by the purchase receiving unit 21. In the example of the coupon screen D5 shown in FIG. 15, when an operation is made on the operating portion d52 in the user terminal U, the items T101, T102 and T103 are added together to the shopping cart of the coupon use user.

The coupon use user can thereby add a plurality of items as items to be purchased to the shopping cart simply by making an operation on the operating portion d52, and therefore there is no need to perform the addition to the shopping cart for each item. Accordingly, a purchase order of a plurality of items can be made easily.

The purchase processing unit 23 is a part that performs purchase processing of a plurality of items based on the purchase order of a plurality of items from the coupon use user which is received by the purchase receiving unit 21. The purchase processing is payment processing, for example.

Further, the purchase processing unit 23 may give specified points in accordance with purchase of a plurality of items by a coupon use user as a reward to the coupon planning user. In this embodiment, the points that are given in accordance with the record of commercial transactions managed in the commercial transaction management device 1 are stored for each user in the user information storage unit 15. Specifically, the purchase processing unit 23 adds specified points in accordance with purchase of a plurality of items by a coupon use user to the points earned (see FIG. 11) of a coupon planning user stored in the user information storage unit 15. Note that the reward given to a coupon planning user is not limited to points, and it may be value such as cash, for example.

In this way, when a coupon use user purchases a plurality of items using a coupon, points, cash or the like are given as a reward to a coupon planning user, and it is therefore possible to increase the level of satisfaction of the coupon planning user and give motivation to the coupon planning user to make a coupon issuance request.

Further, the purchase processing unit 23 may store the purchase record of a plurality of items by a coupon use user as the sales record of a coupon planning user into the sales record storage unit 16. Specifically, the purchase processing unit 23 stores a user ID of a coupon use user (purchase user ID) and URL indicating the location on the network of media on which the coupon is published (coupon publication information) in association with the user ID of the coupon planning user and the coupon ID as the sales record and adds the purchase price of a plurality of items to the total sales.

The sales record based on a coupon issued in response to a coupon issuance request by a coupon planning user is thereby accumulated in association with the coupon planning user, and it is thus possible to allow information about the accumulated sales record to be used for the shop's determination whether or not to accept the sales terms contained in the coupon issuance request from the coupon planning user.

Figure 16:
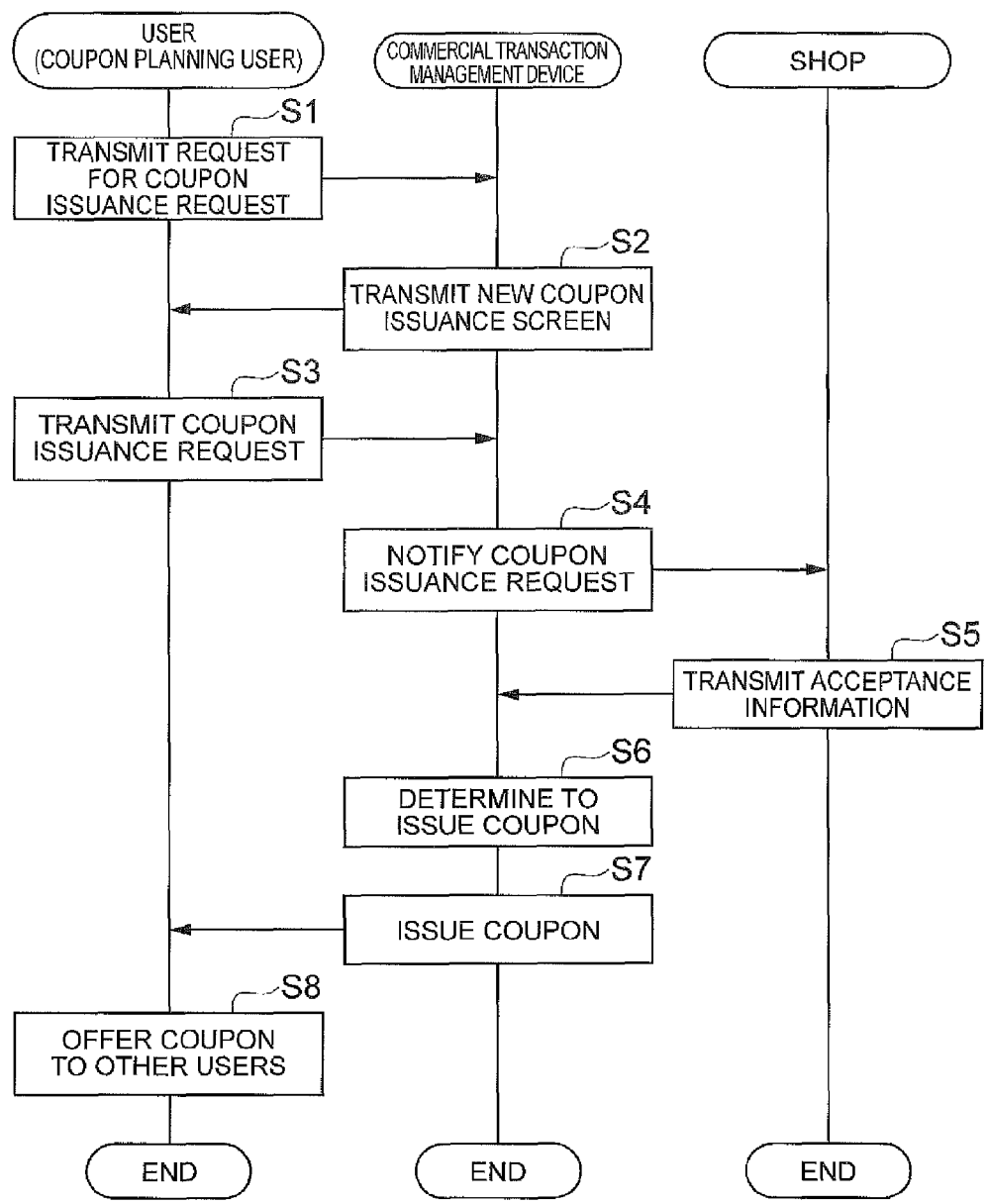
FIG. 16 is a timing chart showing processing (coupon issuance) in the commercial transaction management device according to the first embodiment.

The operation of the commercial transaction management device 1 according to this embodiment is described hereinafter with reference to FIG. 16. FIG. 16 is a timing chart showing coupon issuance processing that is performed in the commercial transaction management device 1, the user terminal U and the shop terminal M.

First, based on input from a coupon planning user, the coupon issuance request transmitting unit 41 of the user terminal U transmits a request for transmitting a coupon issuance request to the commercial transaction management device 1 (S1). In response to the request, the coupon creation control unit 12 transmits a new coupon issuance screen for creating a coupon issuance request to the user terminal U0 (S2).

Then, the coupon issuance request transmitting unit 41 inputs a plurality of items to be purchased by a coupon and sales terms using the new coupon issuance screen as an interface and transmits a coupon issuance request containing the input information to the commercial transaction management device 1 (S3). The notification unit 14 then notifies the coupon issuance request received by the coupon creation control unit 12 to the shop terminal M of a shop that has registered items indicated by item information contained in the coupon issuance request (S4).

A user on the shop side that has received the coupon issuance request determines whether or not to accept the sales terms contained in the coupon issuance request by referring to the content of the coupon issuance request and enters a determination result to the shop terminal M. Then, it is entered that the sales terms are acceptable, the coupon issuance acceptability transmitting unit 34 transmits acceptance information indicating that the sales terms contained in the coupon issuance request are acceptable to the commercial transaction management device 1 (S5).

Receiving the acceptance information, the determination unit 19 determines to accept the sales terms based on the acceptance information received by the receiving unit 18. The issuance of a coupon is thereby determined (S6). Then, the coupon issuance unit 20 issues a coupon allowing purchase of a plurality of items indicated by the item information contained in the coupon issuance request with the accepted sales terms to the coupon planning user (S7). Specifically, the coupon issuance unit 20 transmits information containing the coupon URL issued for the coupon to the coupon issuance user.

The coupon issuance user to which the coupon has been issued offers the issued coupon to other users (S8). Specifically, the coupon publication unit 43 of the user terminal U0 publishes the coupon URL on media such as an email, a blog and a web page and thereby offers the issued coupon to other users.

Figure 17:
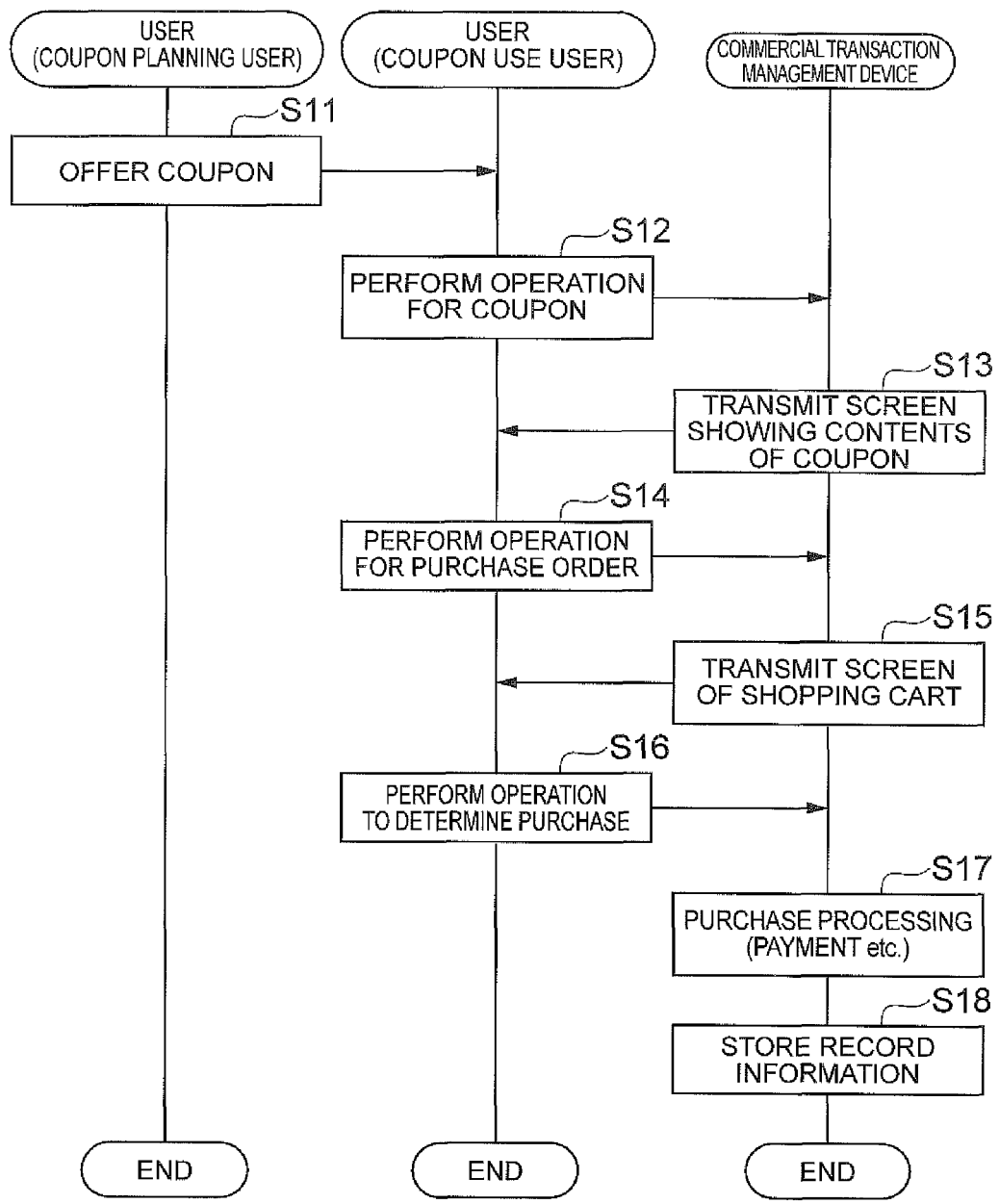
FIG. 17 is a timing chart showing processing (coupon use) in the commercial transaction management device according to the first embodiment.

Processing of item purchase using the issued coupon is described hereinafter with reference to the timing chart of FIG. 17.

First, the coupon is offered from the user terminal U0 of the coupon planning user to the user terminal U of a coupon use user (S11). As described above, an offer of the coupon is made as a result that the coupon URL is published on media such as an email, a blog and a web page by the user terminal U0, the media on which the coupon URL is published are transmitted to the user terminal U of the coupon use user, and the media are displayed on the user terminal U. Accordingly, an offer of the coupon in this Step S11 includes the case where the media containing the coupon URL are directly transmitted from the user terminal U0 of the coupon planning user to the user terminal U of the coupon use user, and the case where information containing the coupon URL transmitted by the user terminal U0 of the coupon planning user is registered in media such as a blog and a web page, and the information registered in the media is transmitted to the user terminal U of the coupon use user.

Then, when an operation on the coupon is performed, that information is transmitted to the commercial transaction management device 1 (S12). Specifically, when a coupon URL is selected in the user terminal U on which the coupon URL (or an object containing a link to access the coupon URL) is displayed, an access requesting transmission of the screen displaying the content of the coupon is made to the commercial transaction management device 1. In response to this, the commercial transaction management device 1 transmits the coupon screen D5 (see FIG. 15) representing the content of the coupon to the user terminal U of the coupon use user (S13).

When an operation is performed on the operating portion d52 for making a purchase order in the user terminal U on which the coupon screen D5 is displayed, purchase order information is transmitted from the user terminal U to the purchase receiving unit 21 of the commercial transaction management device 1 (S14). When the purchase order is received by the purchase receiving unit 21, the purchase item management unit 22 adds a plurality of item information contained in the coupon all together to a shopping cart (purchase item list) and transmits the screen showing the content of the shopping cart to the user terminal U of the coupon use user (S15).

When an operation to determine purchase of the plurality of items is performed in the user terminal U where the content of the shopping cart is displayed, that information is transmitted to the commercial transaction management device 1 (S16). The purchase processing unit 23 receives the information indicating determination of purchase from the user terminal U of the coupon use user and then performs purchase processing (for example, payment processing) of the plurality of items contained in the coupon (S17). Further, the purchase processing unit 23 stores the purchase record related to the purchase processing as the sales record of the coupon planning user into the sales record storage unit 16 (S18).

Figure 18:
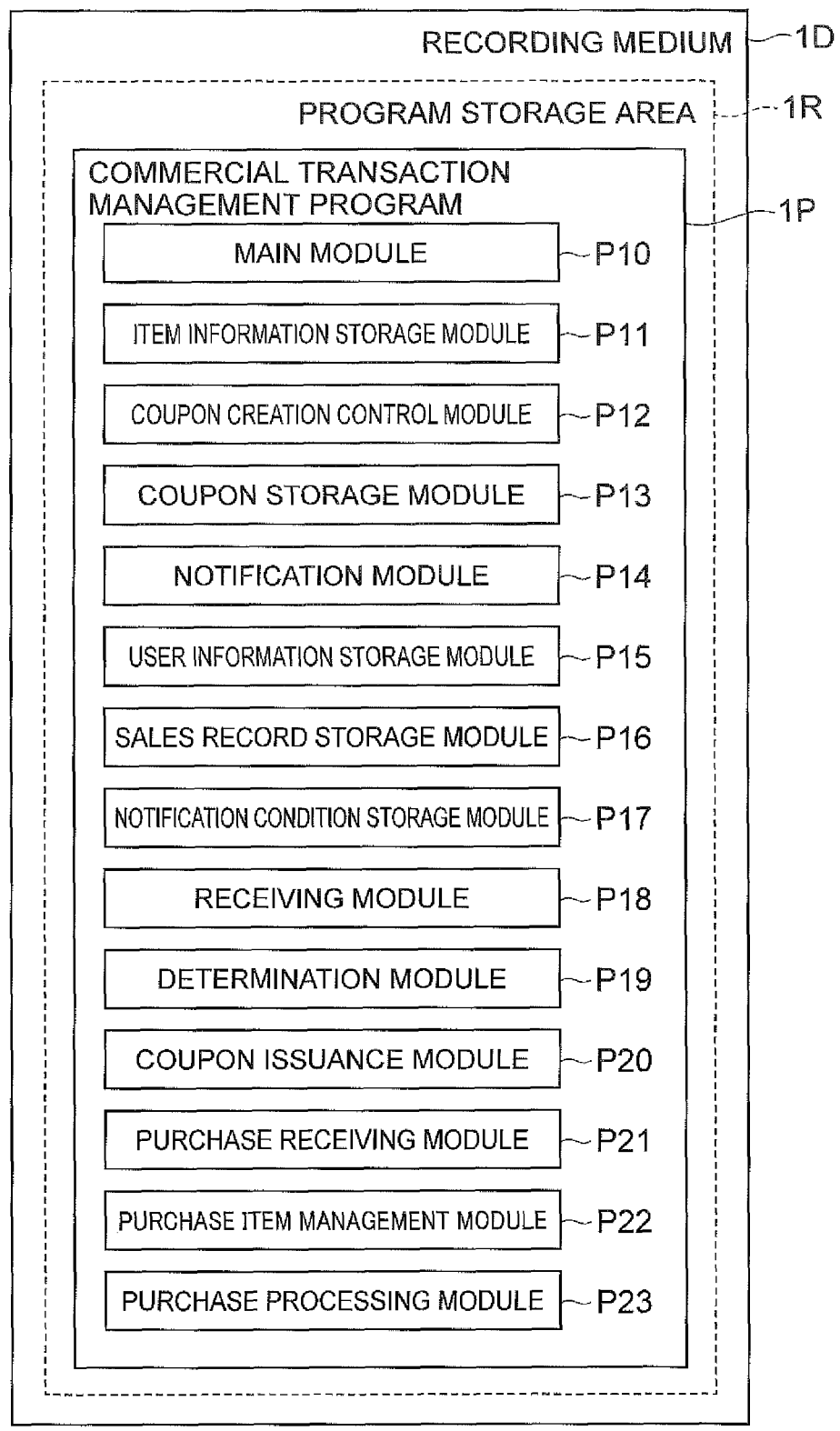
FIG. 18 is a diagram showing a configuration of a commercial transaction management program corresponding to the commercial transaction management device according to the first embodiment.

A data processing program that causes a computer to function as the commercial transaction management device 1 is described hereinafter with reference to FIG. 18. FIG. 18 is a diagram showing a configuration of a commercial transaction management program corresponding to the commercial transaction management device 1 according to the first embodiment shown in FIG. 2.

A commercial transaction management program 1P includes a main module P10, an item information storage module P11, a coupon creation control module P12, a coupon storage module P13, a notification module P14, a user information storage module P15, a sales record storage module P16, a notification condition storage module P17, a receiving module P18, a determination module P19, a coupon issuance module P20, a purchase accepting module P21, a purchase item management module P22 and a purchase processing module P23.

The main module P10 is a part that exercises control over the commercial transaction management device 1. The functions implemented by executing the item information storage module P11, the coupon creation control module P12, the coupon storage module P13, the notification module P14, the user information storage module P15, the sales record storage module P16, the notification condition storage module P17, the receiving module P18, the determination module P19, the coupon issuance module P20, the purchase accepting module P21, the purchase item management module P22 and the purchase processing module P23 are equal to the functions of the item information storage unit 11, the coupon creation control unit 12, the coupon storage unit 13, the notification unit 14, the user information storage unit 15, the sales record storage unit 16, the notification condition storage unit 17, the receiving unit 18, the determination unit 19, the coupon issuance unit 20, the purchase receiving unit 21, the purchase item management unit 22 and the purchase processing unit 23 of the commercial transaction management device 1 shown in FIG. 2, respectively.

The commercial transaction management program 1P is provided through a storage medium such as CD-ROM or DVD-ROM or semiconductor memory, for example. Further, the commercial transaction management program 1P may be provided as a computer data signal superimposed onto a carrier wave over a communication network.

According to the commercial transaction management device 1 and the commercial transaction management method according to the first embodiment described above, the sales terms in the case of purchasing a plurality of items all together are received as the content of a coupon which one user (coupon planning user) desires to issue, and it is determined whether the sales terms are accepted or not. Then, when it is determined to accept the sales terms, the coupon is issued. It is thereby possible to offer the coupon that matches the desire of the user. Further, because a purchase order of a plurality of items with the sales terms from other users (coupon use users) who have received an offer of the coupon from one user are accepted, other users can also purchase the plurality of items with the sales terms contained in the coupon. The sales of the shop thereby increase. Further, because a coupon issuance request containing the sales terms of items desired by a user is notified to a shop, and the acceptance of the sales terms is determined based on acceptance information indicating that the sales terms are acceptable which is transmitted back from the shop in response to the notification of the coupon issuance request, it is possible to appropriately determine whether or not to accept the sales terms in the shop.

Second Embodiment

A commercial transaction management device according to a second embodiment of the present invention is described hereinafter with reference to FIGS. 19 to 23. Note that, in FIGS. 19 to 23, the same or equivalent elements as in the first embodiment are denoted by the same reference symbols, and the redundant explanation thereof is omitted.

In the first embodiment, the coupon issuance request received by the commercial transaction management device 1 is notified to the shop terminal M, and acceptance information as to whether or not to accept the sales terms contained in the coupon issuance request is transmitted from the shop terminal M in response to the notification. On the other hand, in the second embodiment, approval conditions for the acceptable sales terms are registered in advance in the commercial transaction management device 1, and whether or not to accept the sales terms is determined based on the approval conditions without making an inquiry to the shop terminal M for each coupon issuance request.

Figure 19:
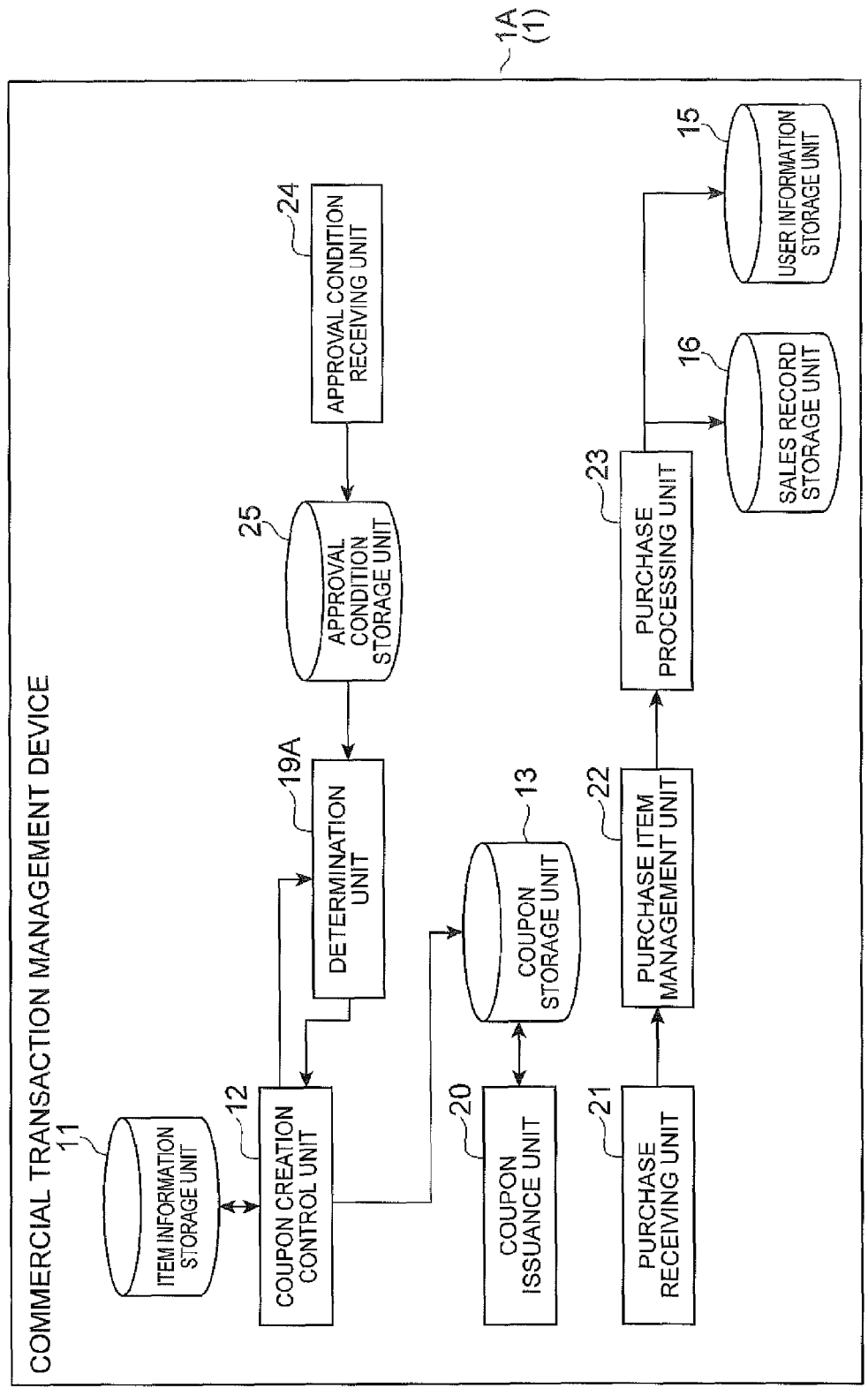
FIG. 19 is a block diagram showing a functional configuration of a commercial transaction management device according to a second embodiment.
Figure 20:
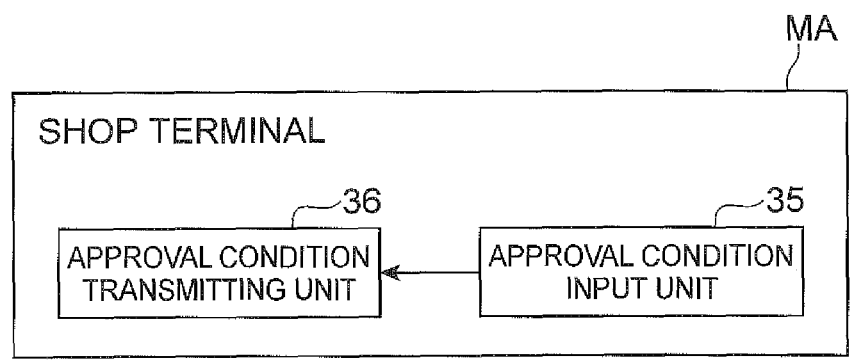
FIG. 20 is a block diagram showing a functional configuration of a shop terminal according to the second embodiment.

FIG. 19 is a block diagram showing a functional configuration of a commercial transaction management device 1A according to the second embodiment. As shown in FIG. 19, the commercial transaction management device 1A functionally includes an item information storage unit 11, a coupon creation control unit 12 (request receiving means, coupon creation control means), a coupon storage unit 13, a user information storage unit 15 (user information storage means, reward information storage means), a sales record storage unit 16 (sales record storage means), a determination unit 19A (determination means), a coupon issuance unit 20 (coupon issuance means), a purchase receiving unit 21 (purchase accepting means), a purchase item management unit 22 (purchase item management means), a purchase processing unit 23 (purchase processing means), an approval condition receiving unit 24 (approval condition receiving means), and an approval condition storage unit 25 (approval condition storage means). Further, FIG. 20 is a block diagram showing a functional configuration of a shop terminal MA according to the second embodiment. The shop terminal MA includes an approval condition input unit 35 and an approval condition transmitting unit 36. In the commercial transaction management device 1A according to the second embodiment, the approval condition receiving unit 24 and the approval condition storage unit 25 are added to, and the notification unit 14 and the receiving unit 18 are eliminated from, the commercial transaction management device 1 according to the first embodiment. Further, the determination unit 19A in the commercial transaction management device 1A has different functions from the determination unit 19 in the commercial transaction management device 1.

The approval condition input unit 35 of the shop terminal MA is a part that receives an input of approval conditions for acceptable sales terms through a keyboard or mouse. Further, the approval condition transmitting unit 36 of the shop terminal MA is a part that transmits the approval conditions received by the approval condition input unit 35 to the commercial transaction management device 1 for registration in advance.

The approval condition receiving unit 24 is a part that receives approval conditions transmitted from the shop terminal MA and stores the received approval conditions into the approval condition storage unit 25, which is a storage means for storing approval conditions. FIG. 21 is a diagram showing an example of approval conditions stored in the approval condition storage unit 25.

As shown in FIG. 21, the approval condition storage unit 25 stores approval conditions for each shop ID that identifies a shop. The approval conditions may include the discount rate from the total sum of regular prices of a plurality of items contained in the coupon issuance request, the discount amount and the like. In the example shown in FIG. 21, as for the coupon issuance request for the shop M1, the sales terms are accepted when the desired sales price as the sales terms is a discount of 30% or less.

The determination unit 19A determines whether or not to accept the sales terms contained in the coupon issuance request by referring to the approval conditions stored in the approval condition storage unit 25. Specifically, in the case where a coupon issuance request to the shop M1 as shown in the new coupon issuance screen D3 of FIG. 9 is received by the coupon creation control unit 12, for example, because the sum total of regular prices of items contained in the coupon issuance request is ¥2400, the desired sales price as the sales terms is ¥1700, and the discount rate is 30% or less, the determination unit 19A determines to accept the sales terms. Thus, in the commercial transaction management device 1A according to the second embodiment, whether or not to accept the sales terms contained in the coupon issuance request is determined based on the approval conditions prestored in the approval condition storage unit 25, and therefore the notification condition storage unit 17 in the commercial transaction management device 1 is not needed, and the determination as to whether to notify the coupon issuance request to the shop terminal MA is not performed.

Figure 22:
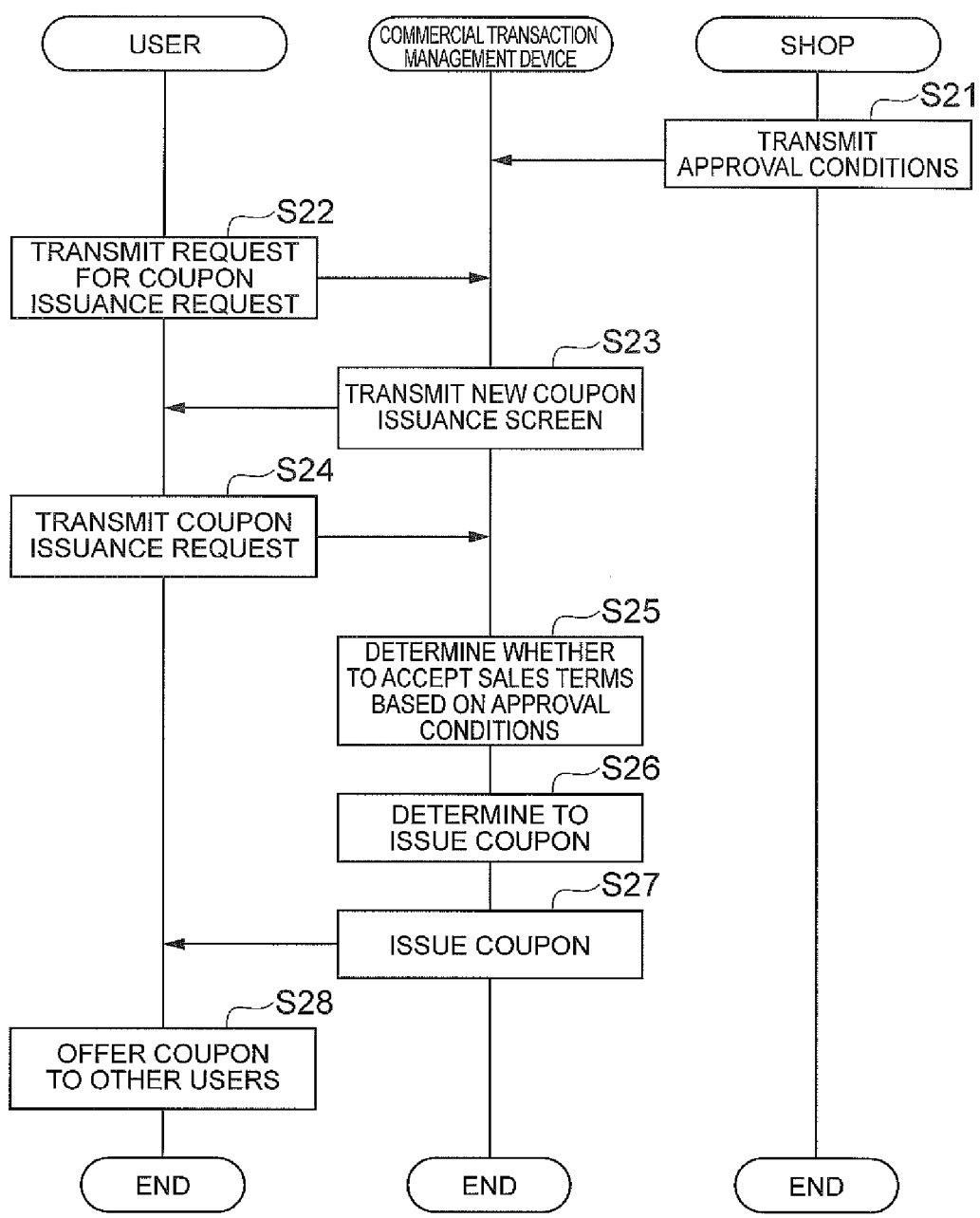
FIG. 22 is a timing chart showing processing in the commercial transaction management device according to the second embodiment.

The operation of the commercial transaction management device 1 according to the second embodiment is described hereinafter with reference to FIG. 22. FIG. 22 is a timing chart showing processing that is performed in the commercial transaction management device 1 according to the second embodiment, the user terminal U and the shop terminal M.

First, the approval condition transmitting unit 36 of the shop terminal MA transmits approval conditions received by the approval condition input unit 35 to the commercial transaction management device 1 to register them (S21). Processing of the subsequent Steps S22 to S24 is the same as the processing of Steps S1 to S3 in the timing chart of FIG. 16.

In Step S25, the determination unit 19A determines whether or not to accept the sales terms contained in the coupon issuance request by referring to the approval conditions stored in the approval condition storage unit 25 (S25). Processing of the subsequent Steps S26 to S28 is the same as the processing of Steps S6 to S8 in the timing chart of FIG. 16.

Figure 23:
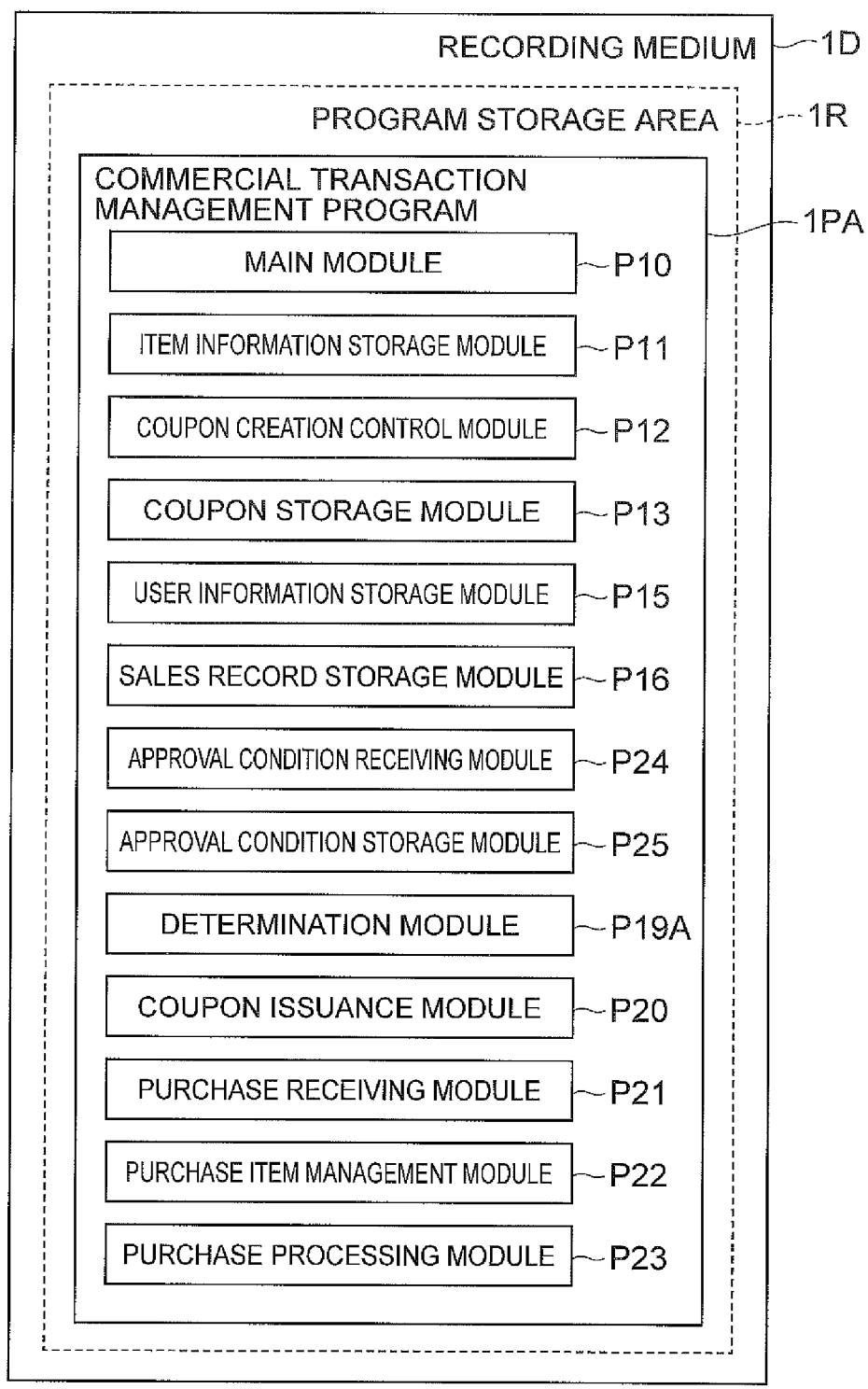
FIG. 23 is a diagram showing a configuration of a commercial transaction management program corresponding to the commercial transaction management device according to the second embodiment.

FIG. 23 is a diagram showing a commercial transaction management program 1PA corresponding to the commercial transaction management device 1A according to the second embodiment shown in FIG. 19.

A commercial transaction management program 1PA includes a main module P10, an item information storage module P11, a coupon creation control module P12, a coupon storage module P13, a user information storage module P15, a sales record storage module P16, an approval condition receiving module P24, an approval condition storage module P25, a determination module P19A, a coupon issuance module P20, a purchase accepting module P21, a purchase item management module P22 and a purchase processing module P23.

The main module P10 is a part that exercises control over the commercial transaction management device 1A. The functions implemented by executing the item information storage module P11, the coupon creation control module P12, the coupon storage module P13, the user information storage module P15, the sales record storage module P16, the approval condition receiving module P24, the approval condition storage module P25, the determination module P19A, the coupon issuance module P20, the purchase accepting module P21, the purchase item management module P22 and the purchase processing module P23 are equal to the functions of the item information storage unit 11, the coupon creation control unit 12, the coupon storage unit 13, the notification unit 14, the user information storage unit 15, the sales record storage unit 16, the receiving unit 18, the approval condition receiving unit 24, the approval condition storage unit 25, the determination unit 19A, the coupon issuance unit 20, the purchase receiving unit 21, the purchase item management unit 22 and the purchase processing unit 23 of the commercial transaction management device 1A shown in FIG. 19, respectively.

According to the commercial transaction management device 1 and the commercial transaction management method according to the second embodiment described above, whether or not to accept the sales terms contained in the coupon issuance request is determined based on the approval conditions received from a shop and stored in advance, and therefore the shop does not need to perform determination as to whether to accept the sales terms each time receiving one coupon issuance request from a user. It is thereby possible to reduce the load on the shop for processing of coupon issuance.

Third Embodiment

Figure 24:
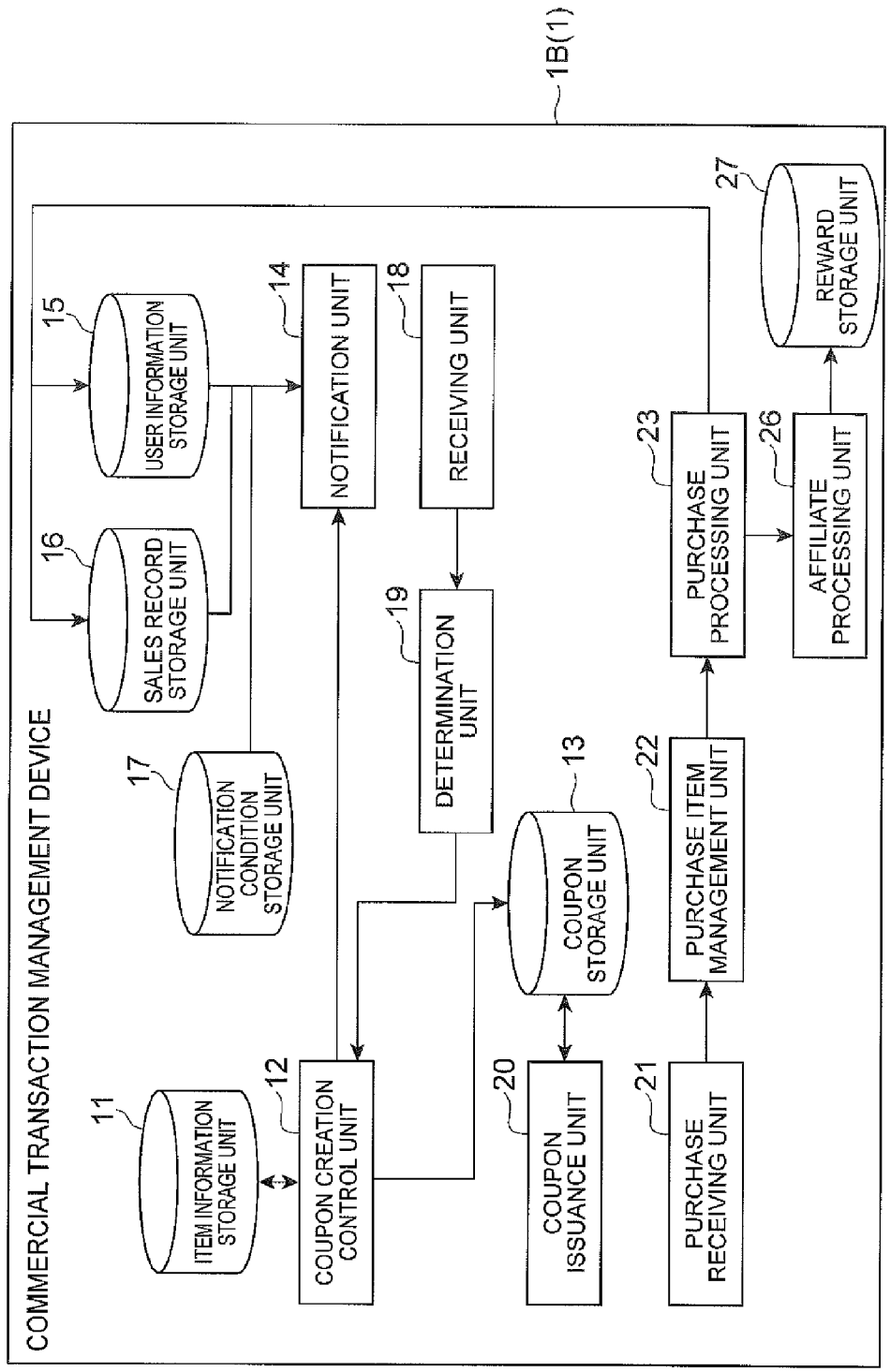
FIG. 24 is a block diagram showing a functional configuration of a commercial transaction management device according to a third embodiment.

A commercial transaction management device according to a third embodiment of the present invention is described hereinafter with reference to FIGS. 24 to 25. Note that, in FIGS. 24 to 25, the same or equivalent elements as in the first embodiment are denoted by the same reference symbols, and the redundant explanation thereof is omitted.

The commercial transaction management device 1B according to the third embodiment includes an affiliate processing unit 26 (purchase processing means) and a reward storage unit 27 (reward information storage means) in addition to the functional units 11 to 23 included in the commercial transaction management device 1 according to the first embodiment. In the third embodiment, the coupon issuance request may contain an affiliate fee rate that is the percentage of an affiliate fee paid to a coupon planning user from a shop in accordance with the sales of items with respect to the amount of sales of the items. In other words, a coupon planning user can set their original affiliate fee rate together with the sales terms in the coupon issuance request.

The notification unit 14 notifies the coupon issuance request containing setting of the affiliate fee rate received by the coupon creation control unit 12 to the shop terminal M. A user in the shop determines whether or not to accept the sales terms related to the price and the like and further determine whether or not to accept the affiliate fee rate, and transmits a result of the determination as acceptance information to the commercial transaction management device 1B. When the sales terms and the affiliate fee rate are accepted in this manner, the coupon issuance unit 20 issues a coupon including the original affiliate fee rate.

When a purchase order of a plurality of items based on the coupon containing the original affiliate fee rate is received from the user terminal U of a coupon use user by the purchase receiving unit 21, the purchase processing unit 23 performs specified purchase processing and further causes the affiliate processing unit 26 to perform affiliate processing based on the original affiliate fee rate. Specifically, the affiliate processing unit 26 adds the amount obtained by multiplying the amount of sales of a plurality of items processed by the purchase processing unit 23 by the affiliate fee rate to reward data of the coupon planning user stored in the reward storage unit 27.

The reward storage unit 27 is a part that stores the sum total of affiliate fees paid to users as reward data for each user. FIG. 25 is a diagram showing a configuration of the reward storage unit 27 and an example of data stored therein. As shown in FIG. 25, the reward storage unit 27 stores reward data for each user ID.

As described above, by giving an affiliate fee to a coupon planning user based on an affiliate fee rate, it is possible to provide the coupon planning user with further incentives. The issuance of a coupon is thereby enhanced.

Hereinbefore, the present invention has been described in detail with respect to the embodiment thereof. However, the present invention is not limited to the above-described embodiment. Various changes and modifications may be made therein without departing from the scope of the invention.

INDUSTRIAL APPLICABILITY

As described above, according to the embodiment, there is provided a commercial transaction management device that can offer a coupon that meets a user's requirements and increase sales of items and the like related to the coupon in electronic commerce.

REFERENCE SIGNS LIST 1,1A,1B . . . commercial transaction management device, M,MA . . . shop terminal, U,U0 . . . user terminal, 11 . . . item information storage unit, 12 . . . coupon creation control unit, 13 . . . coupon storage unit, 14 . . . notification unit, 15 . . . user information storage unit, 16 . . . sales record storage unit, 17 . . . notification condition storage unit, 18 . . . receiving unit, 19,19A . . . determination unit, 20 . . . coupon issuance unit, 21 . . . purchase receiving unit, 22 . . . purchase item management unit, 23 . . . purchase processing unit, 24 . . . approval condition receiving unit, 25 . . . approval condition storage unit, 26 . . . affiliate processing unit, 27 . . . reward storage unit, 31 . . . coupon issuance request acquisition unit, 32 . . . coupon issuance request presentation unit, 33 . . . coupon issuance acceptability input unit, 34 . . . coupon issuance acceptability transmitting unit, 35 . . . approval condition input unit, 36 . . . approval condition transmitting unit, 41 . . . coupon issuance request transmitting unit, 42 . . . coupon receiving unit, 43 . . . coupon publication unit, d23 . . . operating portion, 1D . . . storage medium, 1P,1PA . . . commercial transaction management program, P10 . . . main module, P11 . . . item information storage module, P12 . . . coupon creation control module, P13 . . . coupon storage module, P14 . . . notification module, P15 . . . user information storage module, P16 . . . sales record storage module, P17 . . . notification condition storage module, P18 . . . receiving module, P19,P19A . . . determination module, P20 . . . coupon issuance module, P21 . . . purchase receiving module, P22 . . . purchase item management module, P23 . . . purchase processing module, P24 . . . approval condition receiving module, P25 . . . approval condition storage module

The invention claimed is:

1. A commercial transaction management device that receives registration of item information indicating items on sale from a shop and receives an order for purchase of items indicated by the registered item information from a user, comprising:

at least one memory operable to store program code;
at least one processor operable to read the program code and operate as instructed by the program code, the program code including:
  request receiving code configured to cause the at least one processor to receive a coupon issuance request for an electronic coupon, the coupon issuance request containing item information related to a plurality of items selected by one user at a user terminal from the items registered by the shop and sales terms designated by said one user at the user terminal, wherein the sales terms is to be used, if accepted, when the plurality of items are purchased together by using the electronic coupon;

approval condition receiving code configured to cause the at least one processor to receive approval condition related to acceptable sales terms from the shop and store the received approval condition into an approval condition storage;

determination code configured to cause the at least one processor to determine to accept the sales terms contained in the coupon issuance request when the approval condition, received by the approval condition receiving code from the shop having registered the items indicated by the item information contained in the coupon issuance request, is satisfied;

coupon issuance code configured to cause the at least one processor to, when the sales terms are accepted by the determination code, issue an electronic coupon allowing purchase of the plurality of items indicated by the item information contained in the coupon issuance request with the sales terms and transmit a notification on a location of the issued electronic coupon to the user terminal of said one user; and purchase receiving code configured to cause the at least one processor to receive a purchase order of the plurality of items with the sales terms contained in the electronic coupon from said one user or another user different from said one user and having received an offer of the electronic coupon issued by the coupon issuance code.

2. The commercial transaction management device according to claim 1, wherein
the determination code causes the at least one processor to determine whether to accept sales terms including an affiliate fee rate being a percentage of a reward granted in accordance with a record of commercial transactions in the commercial transaction management device with respect to an amount of sales.

3. The commercial transaction management device according to claim 1, wherein the program code further includes:
coupon creation control code configured to cause the at least one processor to transmit a user interface for creating the coupon issuance request to the user terminal, wherein the user interface includes at least an operating portion for selecting the shop and the plurality of items as a target of the electronic coupon.

4. The commercial transaction management device according to claim 3, wherein the user interface comprises an item information page including an operating portion for purchasing an item, an operating portion for selecting the plurality of items being added to the item information page.

5. A commercial transaction management method in a commercial transaction management device that receives registration of item information indicating items on sale from a shop and receives an order for purchase of items indicated by the registered item information from a user, the method comprising:

a request receiving step of receiving a coupon issuance request for an electronic coupon, the coupon issuance request containing item information related to a plurality of items selected by one user at a user terminal from the items registered by the shop and sales terms designated by said one user at the user terminal, wherein the sales terms is to be used, if accepted, when the plurality of items are purchased together by using the electronic coupon;

an approval condition receiving step of receiving approval condition related to acceptable sales terms from the shop and storing the received approval condition into an approval condition storage;

a determination step of determining to accept the sales terms contained in the coupon issuance request when the approval condition, received in the approval condition receiving step, from the shop having registered the items indicated by the item information contained in the coupon issuance request, is satisfied;

a coupon issuance step of, when the sales terms are accepted in the determination step, issuing an electronic coupon allowing purchase of the plurality of items indicated by the item information contained in the coupon issuance request with the sales terms and transmitting a notification on a location of the issued electronic coupon to the user terminal of said one user; and a purchase receiving step of receiving a purchase order of the plurality of items with the sales terms contained in the electronic coupon from said one user or another user different from said one user and having received an offer of the electronic coupon issued in the coupon issuance step.

* * * * *